(12) United States Patent
Mizoguchi et al.

(10) Patent No.: US 12,472,977 B2
(45) Date of Patent: Nov. 18, 2025

(54) VEHICLE POSITION GENERATION APPARATUS, VEHICLE, AND SERVER

(71) Applicant: SUBARU CORPORATION, Tokyo (JP)

(72) Inventors: Masato Mizoguchi, Tokyo (JP); Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 350 days.

(21) Appl. No.: 18/179,758

(22) Filed: Mar. 7, 2023

(65) Prior Publication Data

US 2023/0303116 A1    Sep. 28, 2023

(30) Foreign Application Priority Data

Mar. 28, 2022   (JP) .................................. 2022-051648

(51) Int. Cl.
*B60W 60/00*     (2020.01)
*G01C 21/00*     (2006.01)
*G06V 20/56*     (2022.01)

(52) U.S. Cl.
CPC ....... *B60W 60/001* (2020.02); *G01C 21/3848* (2020.08); *G06V 20/56* (2022.01); *B60W 2420/403* (2013.01); *B60W 2556/45* (2020.02)

(58) Field of Classification Search
CPC ......... B60W 60/001; B60W 2420/403; B60W 2556/45; G01C 21/3848; G01C 21/28; G06V 20/56

See application file for complete search history.

(56) References Cited

U.S. PATENT DOCUMENTS

| | | | |
|---|---|---|---|
| 2017/0314956 A1 | 11/2017 | Shiina et al. | |
| 2019/0339709 A1* | 11/2019 | Tay | G06F 16/23 |
| 2021/0020073 A1* | 1/2021 | Asmari | G09B 29/007 |
| 2021/0180982 A1* | 6/2021 | Watanabe | G01C 21/3815 |

(Continued)

FOREIGN PATENT DOCUMENTS

| | | | |
|---|---|---|---|
| JP | 2011013075 A | * | 1/2011 |
| JP | 2020-038361 A | | 3/2020 |
| WO | 2016/093028 A | | 6/2016 |

OTHER PUBLICATIONS

Machine Translation: JP-2011013075-A (Year: 2011).*

*Primary Examiner* — Anne Marie Antonucci
*Assistant Examiner* — Connor L Knight
(74) *Attorney, Agent, or Firm* — Rimon P.C.

(57) ABSTRACT

A vehicle position generation apparatus to be applied to a vehicle includes a memory, an imaging device, and a processor. The memory holds map data including information on at least positions of standing structures arranged to stand along a road on which the vehicle travels. The imaging device captures an image of a forward side in a traveling direction of the vehicle. The processor acquires information from the memory and the imaging device, and processes the acquired information. The processor generates information on one or more standing structures included in the captured image obtained by the imaging device, identifies, in the map data, positions of the one or more standing structures on which the information has been generated, and generates a position of the vehicle, based on the positions of the one or more standing structures identified in the map data, and the captured image.

13 Claims, 15 Drawing Sheets

(56) References Cited

U.S. PATENT DOCUMENTS

2021/0199463 A1     7/2021  Kitahara et al.
2021/0302993 A1*    9/2021  Zang ...................... G05D 1/024
2021/0387650 A1*   12/2021  Li ......................... B60W 50/14

* cited by examiner

VEHICLE POSITION GENERATION APPARATUS, VEHICLE, AND SERVER

CROSS-REFERENCE TO RELATED APPLICATIONS

The present application claims priority from Japanese Patent Application No. 2022-051648 filed on Mar. 28, 2022, the entire contents of which are hereby incorporated by reference.

BACKGROUND

The disclosure relates to a vehicle position generation apparatus, a vehicle, and a server.

For vehicles including automobiles, research and development have been made to make it possible to execute traveling control that assists driver's driving operations, and execute traveling control on the basis of automatic driving. The automatic driving basically includes driving without the driver's driving operations, but may also include the driving assistance described above.

In such traveling control of a vehicle, it is desired to obtain a current position of the vehicle, and generate a direction in which the vehicle travels from the current position. In addition, in the traveling control of the vehicle, it is possible to continuously control traveling of the vehicle by repeatedly acquiring the current position of the vehicle.

The current position of the vehicle may be generated by, for example, a GNSS receiver provided in the vehicle. The GNSS receiver receives radio waves from GNSS satellites. Thus, for example, a traveling control apparatus of the vehicle is able to acquire the current position of the vehicle by calculation, on the basis of information included in the radio waves.

However, in a vehicle such as an automobile, a GNSS receiver can be unable to favorably receive radio waves from GNSS satellites in a traveling situation such as a tunnel, a valley between buildings, or a road in a forest. In this case, the vehicle can be unable to obtain a current position, or unable to obtain a reliable current position. For example, reference is made to Japanese Unexamined Patent Application Publication (JP-A) No. 2020-038361 and

SUMMARY

An aspect of the disclosure provides a vehicle position generation apparatus to be applied to a vehicle. The vehicle position generation apparatus includes a memory, an imaging device, and a processor. The memory is configured to hold map data including information on at least positions of standing structures arranged to stand along a road on which the vehicle travels. The imaging device is configured to capture an image of a forward side in a traveling direction of the vehicle. The processor is configured to acquire information from the memory and the imaging device, and process the acquired information. The processor is configured to generate information on one or more standing structures included in the captured image obtained by the imaging device, identify, in the map data, positions of the one or more standing structures on which the information has been generated, and generate a position of the vehicle, based on the positions of the one or more standing structures identified in the map data, and the captured image.

An aspect of the disclosure provides a vehicle including a traveling control apparatus configured to control traveling of the vehicle by using a position generated by the above-described vehicle position generation apparatus.

An aspect of the disclosure provides a server including a traveling control processor and a transmission device. The traveling control processor is configured to generate traveling control information to be used to control traveling of a vehicle. The transmission device is configured to transmit the traveling control information generated by the traveling control processor to the vehicle. The traveling control processor is configured to generate the traveling control information, assuming that the vehicle is located at a position generated by the above-described vehicle position generation apparatus.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
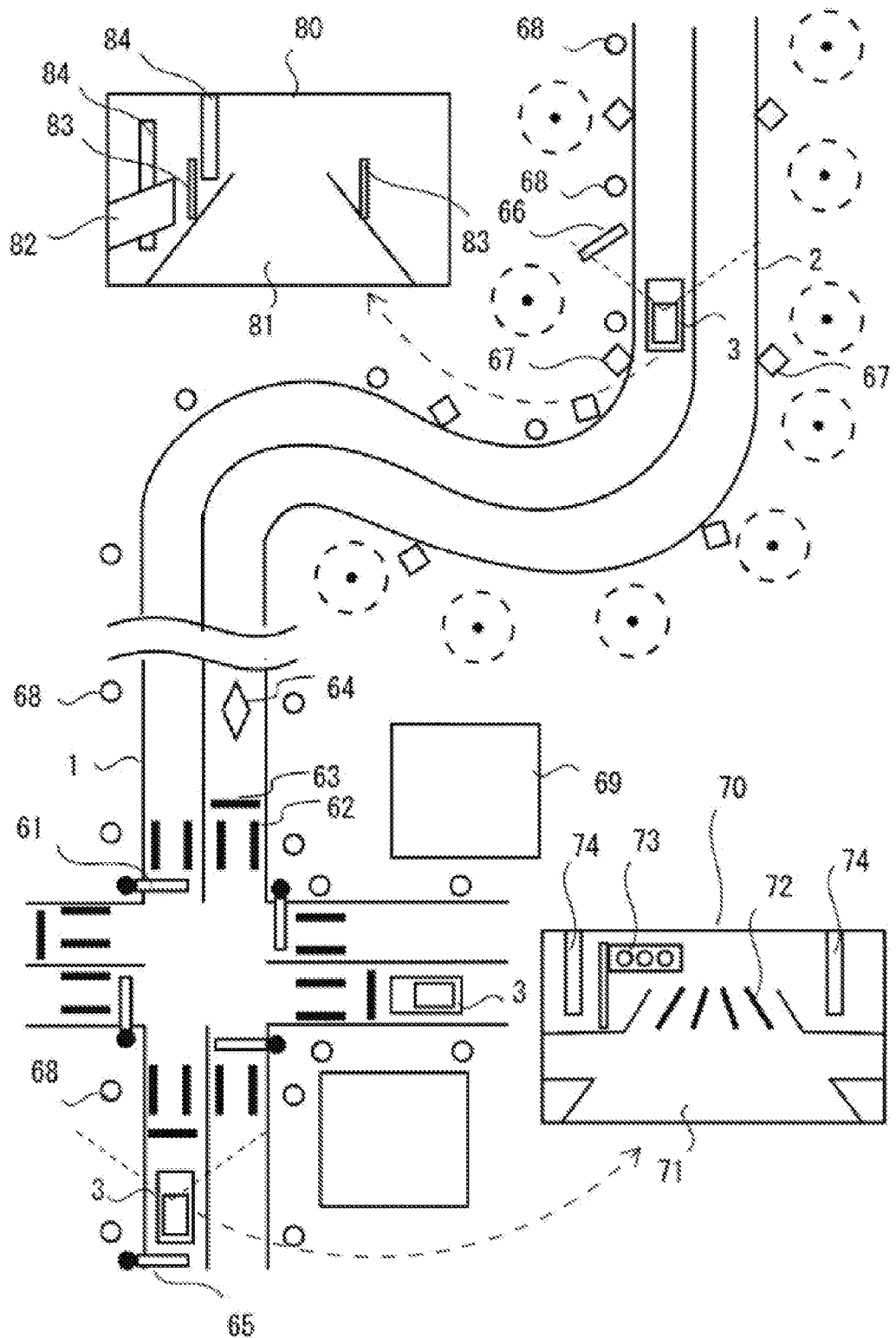
FIG. 1 is an explanatory diagram illustrating a traveling environment of a vehicle.

In JP-A No. 2020-038361 and International Publication No. WO 2016/093028, an image of, for example, a signboard is captured from a vehicle, and a position of the vehicle is corrected on the basis of the captured image. However, a signboard whose image is to be captured in JP-A No. 2020-038361 and International Publication No. WO 2016/093028 is not necessarily provided for a road on which the vehicle travels. In this case, the techniques disclosed in JP-A No. 2020-038361 and International Publication No. WO 2016/093028 are expected to be difficult to apply widely and universally to a road on which the vehicle travels.

In another example, a zebra zone, a stop line, and a traffic marking for a crosswalk are drawn on a road surface of a road in some cases. An image of these drawn objects may be captured, and a position of the vehicle may be corrected on the basis of the captured image. However, the road surface of the road can be covered by, for example, snow or dirt. In this case, the vehicle is unable to obtain information for correction of the position of the own vehicle, even by capturing an image of the road surface.

In addition, a road sign and a traffic light are provided on a road. These structures including the road sign and the traffic light are provided in the air above the road to be easily viewed from a driver who drives the vehicle. In this case, in morning or evening time when the sun is low, the road sign or the traffic light provided in the air is difficult to see from the driver. Also in an image captured from the vehicle, display of the road sign or the traffic light is difficult to identify clearly. In addition, if snow accumulates on the road sign or the traffic light, the road sign or the traffic light itself can become unrecognizable.

It is desirable to provide a vehicle position generation apparatus, a vehicle, and a server that make it possible to, in generating a vehicle position, improve reliability of the generated vehicle position.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is an explanatory diagram illustrating a traveling environment of a vehicle 3.

In FIG. 1, multiple vehicles 3 to which an example embodiment of the disclosure is applicable may travel on roads. The vehicle 3 may also be referred to as an own vehicle. The vehicle 3 may be an automobile, for example. The vehicle 3 may travel by means of drive force of an engine, or travel by means of drive force of a motor that uses electric power of a battery.

Illustrated in a lower part of FIG. 1 is a road 1 in an urban area. At an intersection of the road 1 in the urban area, a traffic light 61, a zebra zone 62, and a stop line 63 may be provided. The traffic light 61 may be provided for a road or lane extending into the intersection. The zebra zone 62 may be drawn on a road surface near the intersection to indicate a position where a pedestrian is allowed to cross the intersection. The stop line 63 may be drawn on the road surface near the zebra zone 62 to make the vehicle 3 stop before the zebra zone 62. On the road surface near the zebra zone 62, a traffic marking 64 may be drawn to give advance notice of the presence of a crosswalk in a traveling direction. A road sign 65 indicating information such as a destination may also be provided near the intersection. The traffic light 61 and the road sign 65, for example, may be provided in the air above the road surface, to be easily viewed by a driver who drives the vehicle 3, by being supported by poles provided to stand at a place such as a road shoulder. In addition, in the urban area, buildings 69 may stand, for example, near the intersection. The road may have multiple utility poles 68 arranged along the road to distribute electric power to the buildings 69. In general, the utility poles 68 are typically arranged to stand at a place such as the road shoulder at an interval of, for example, several tens of meters.

Illustrated in an upper part of FIG. 1 is a road 2 in a suburban area, for example, in a forest. In this case, a large number of trees may stand on both sides of the road 2 in the suburban area. A signboard 66, the utility poles 68, and border poles 67 may be provided to stand by the road 2 in the suburban area. In general, the utility poles 68 are arranged to stand along the road at an interval of, for example, several tens of meters, at a place such as a road shoulder. The border poles 67 may be provided to stand at a predetermined interval on each side of the road to indicate a position of the road shoulder.

The vehicle 3 may travel on the road 1 in the urban area in the lower part of FIG. 1, or the road 2 in the suburban area in the upper part of FIG. 1. The vehicle 3 may travel on the basis of only the driver's operations, travel while assisting the driver's operations, or travel under automatic driving without the driver's operations. Driving assistance that assists the driver's operations may be a kind of automatic driving.

Figure 2:
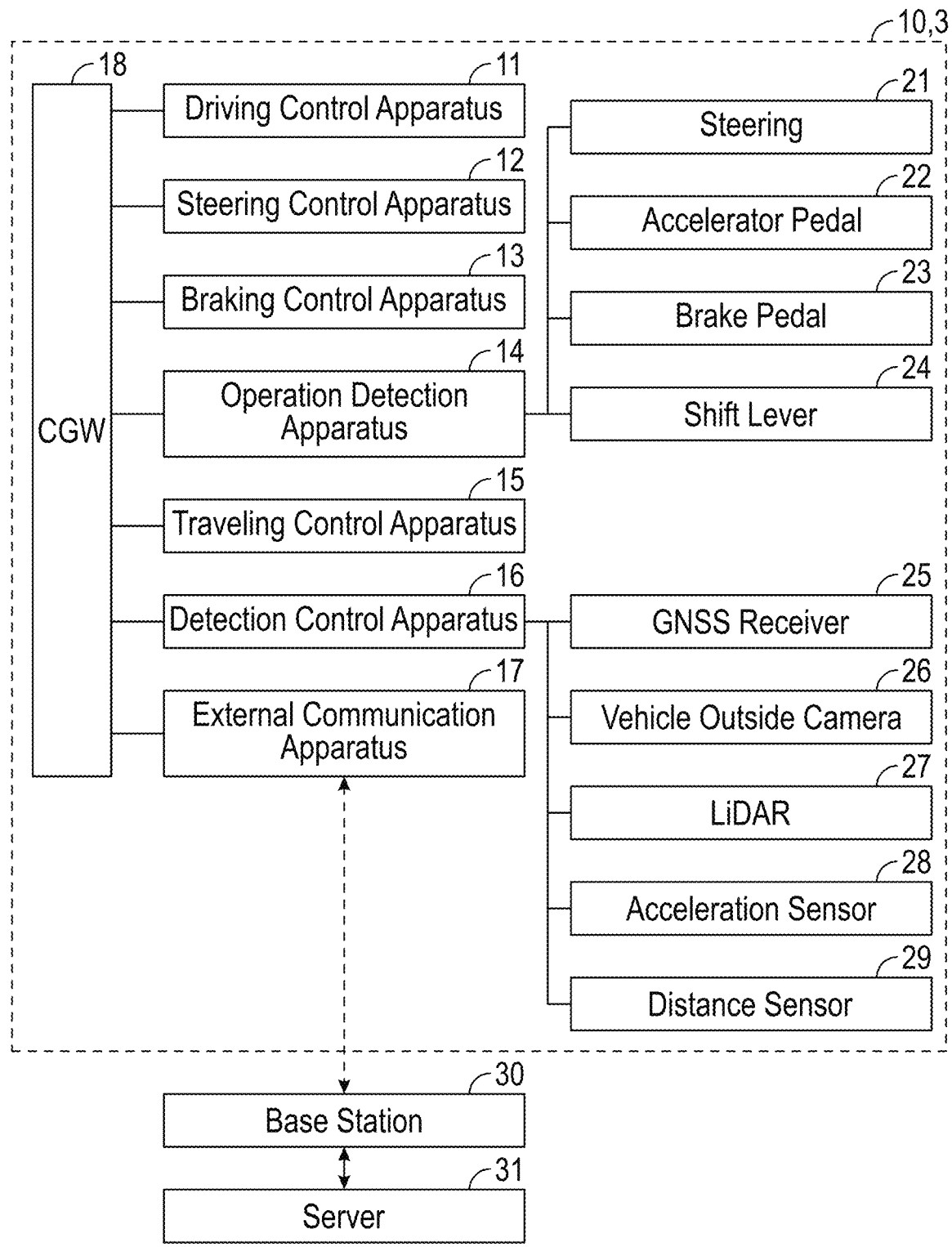
FIG. 2 is an explanatory diagram illustrating a control system of the vehicle according to one example embodiment of the disclosure.

FIG. 2 is an explanatory diagram illustrating a control system 10 of the vehicle 3 according to a first example embodiment of the disclosure.

In one embodiment, the control system 10 in FIG. 2 may serve as a "vehicle position generation apparatus" to be provided in the vehicle 3 in FIG. 1.

The control system 10 of the vehicle 3 in FIG. 2 may include control apparatuses including a traveling control apparatus 15 that executes automatic driving. FIG. 2 illustrates the control apparatuses including a driving control apparatus 11, a steering control apparatus 12, a braking control apparatus 13, an operation detection apparatus 14, the traveling control apparatus 15, a detection control apparatus 16, and an external communication apparatus 17. The control system 10 of the vehicle 3 may further include other control apparatuses including, for example, an air conditioning control apparatus, an occupant monitoring apparatus, a short-range communication apparatus, and an alarm apparatus. The control apparatuses may be coupled to a central gateway (CGW) 18 via cables. The CGW 18 may configure a vehicle network. The cables may be coupled to the CGW 18. The control apparatuses may be star-coupled or bus-coupled to the CGW 18. The vehicle network may be based on a standard such as a controller area network (CAN) or a local interconnect network (LIN). Alternatively, the vehicle network may be based on a general-purpose wired communication standard such as a local area network (LAN), a wireless communication standard, or a combination thereof. An identification (ID) may be assigned to each of the control apparatuses for distinction from the other control apparatuses. The control apparatuses may each input and output various pieces of information in packets with a destination ID and a sender ID added thereto. The CGW 18 may monitor the packets on the vehicle network and perform routing thereon. The CGW 18 may verify the packets against a list and control the routing.

The driving control apparatus 11 may control the drive source and a drive force transmission mechanism of the vehicle 3. The drive force transmission mechanism may include, for example, a decelerator and a central differential. The drive force transmission mechanism may control magnitudes of the drive forces to be transmitted to wheels of the vehicle 3 on an individual basis.

The steering control apparatus 12 may control a steering device that changes orientations of the front wheels of the vehicle 3. The vehicle 3 may change the traveling direction in response to changes in orientation of the wheels.

The braking control apparatus 13 may control a braking device that brakes the wheels of the vehicle 3 on an individual basis. The braking device may control magnitudes of braking forces to be exerted on the wheels of the vehicle 3 on an individual basis.

Operation members may be coupled to the operation detection apparatus 14. The operation members may be provided in the vehicle 3 to allow an occupant of the vehicle 3 to perform operations related to traveling of the vehicle 3. The operation members may include, for example, a steering 21, an accelerator pedal 22, a brake pedal 23, and a shift lever 24. The operation detection apparatus 14 may detect, for example, whether an operation has been performed and an amount of the operation for each of the operation members, and may output operation information to the vehicle network.

Detection members may be coupled to the detection control apparatus 16. The detection members may be provided to detect a traveling state and the traveling environment of the vehicle 3. The detection members may include, for example, a global navigation satellite system (GNSS) receiver 25, a vehicle outside camera 26, a light detection and ranging (LiDAR) 27, an acceleration sensor 28, and a distance sensor 29.

The GNSS receiver 25 may receive radio waves from unillustrated GNSS satellites and generate information on a current position at which the vehicle 3 equipped with the GNSS receiver 25 is located, and a current time. The GNSS receiver 25 may be able to receive ground waves or radio waves from a quasi-zenith satellite to thereby generate highly accurate information on the current position and the current time.

The vehicle outside camera 26 may capture an image of the outside of the vehicle 3 which travels on a road, for example. The vehicle outside camera 26 may be a monocular camera or a stereo camera. The stereo camera may capture multiple images. The vehicle 3 may be provided with multiple vehicle outside cameras 26. The multiple vehicle outside cameras 26 may capture images of an environment around the vehicle 3 in forward, backward, rightward, and leftward directions.

The LiDAR 27 may scan with a laser the outside of the vehicle 3 which travels on a road, for example, and may generate outside-vehicle spatial information on the basis of a reflected wave of a laser beam. The outside-vehicle spatial information may include an image of, for example, another vehicle located around the vehicle 3. The vehicle outside camera 26 and the LiDAR 27 may serve as sensors that detect the other vehicle located around the vehicle 3.

The acceleration sensor 28 may detect accelerations in axial directions including a front-rear direction, a left-right direction, and an up-down direction of the vehicle 3, for example. In this case, the acceleration sensor 28 may be able to detect accelerations in a yaw direction, a roll direction, and a pitch direction of the vehicle 3.

The distance sensor 29 may detect an amount of movement of the vehicle 3, for example, on the basis of an amount of rotation of any of the wheels of the vehicle 3.

The detection control apparatus 16 may output detection information available from these various detection members provided in the own vehicle to the vehicle network. The detection control apparatus 16 may generate information on the basis of the detection information, for example, detection information on the other vehicle located around the own vehicle, and may output the generated information to the vehicle network.

FIG. 1 illustrates multiple captured images obtained by the vehicle outside camera 26 of the vehicle 3.

A captured image 70 of the urban area illustrated in the lower part of FIG. 1 may be an image of a forward side in the traveling direction of the own vehicle captured by the vehicle 3 traveling on the road 1 in the urban area, by means of the vehicle outside camera 26, in an angle-of-view range indicated by a dashed line in the drawing. In the captured image 70 of the urban area, together with an image 71 of the road surface at the intersection, an image 73 of the traffic light present near the intersection, an image 72 of the zebra zone, and images 74 of the utility poles may be included to be recognizable in the image.

A captured image 80 of the suburban area illustrated in the upper part of FIG. 1 may be an image of the forward side in the traveling direction of the own vehicle captured by the vehicle 3 traveling on the road 2 in the suburban area, by means of the vehicle outside camera 26, in an angle-of-view range indicated by a dashed line in the drawing. In the captured image 80 of the suburban area, together with an image 81 of a straight and long road surface, an image 82 of the signboard provided to stand on each side of the road, images 84 of the utility poles, and images 83 of the border poles may be included to be recognizable in the image.

The vehicle outside camera 26 may repeatedly capture images of the environment around the vehicle 3 while the vehicle 3 is traveling, and output the captured images to the detection control apparatus 16. The detection control apparatus 16 may analyze the captured image obtained by the vehicle outside camera 26, identify the images 71 to 74 and 81 to 84 included in the captured image, for example, on the basis of shapes of the images, and extract the various structures 61 to 68 included in the captured image. In this case, the detection control apparatus 16 may output information on the structures 61 to 68 extracted from the captured image, together with the captured image obtained by the vehicle outside camera 26, to the traveling control apparatus 15, for example, via the vehicle network.

In one embodiment, the vehicle outside camera 26 described above may serve as an "imaging device" that captures an image of the forward side in the traveling direction of the vehicle 3.

The external communication apparatus 17 may establish a wireless communication path to a base station 30 provided near, for example, a road outside the vehicle 3. The base station 30 may be a base station of a carrier, or may be a base station for advanced traffic information. The external communication apparatus 17 may, via the base station 30, transmit and receive information to and from a server 31 coupled to the base station 30. The server 31 may be provided in a distributed arrangement in correspondence with the base station 30. By providing the base station 30 for 5G communication with a function of the server 31, it becomes possible for the external communication apparatus 17 of the vehicle 3 to execute a high-speed and large-capacity communication with the server 31 in the base station 30.

The traveling control apparatus 15 controls the traveling of the vehicle 3.

The traveling control apparatus 15 may generate a control value to be used to control the traveling of the vehicle 3, and output the control value to the driving control apparatus 11, the steering control apparatus 12, and the braking control apparatus 13.

This enables the vehicle 3 to travel on a road in accordance with traveling control performed by the traveling control apparatus 15.

Figure 3:
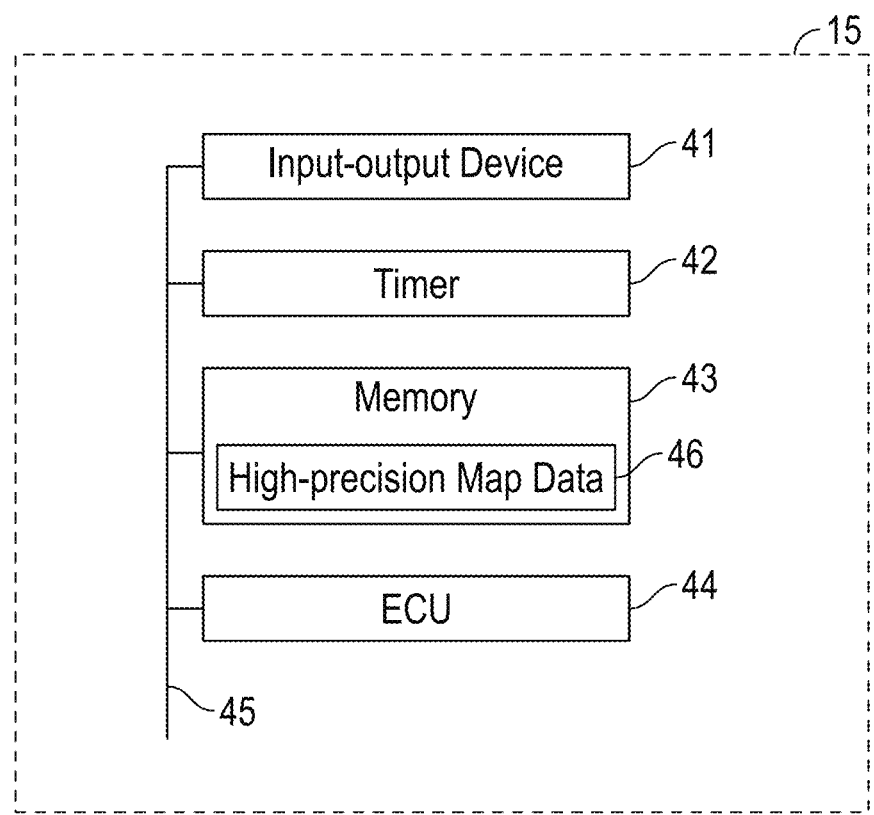
FIG. 3 is a diagram illustrating a basic configuration of a traveling control apparatus in FIG. 2.

FIG. 3 is a diagram illustrating a basic configuration of the traveling control apparatus 15 in FIG. 2.

The traveling control apparatus 15 in FIG. 3 may include an input-output device 41, a timer 42, a memory 43, an electronic control unit (ECU) 44, and an internal bus 45. The input-output device 41, the timer 42, the memory 43, and the ECU 44 may be coupled to the internal bus 45.

The various control apparatuses used in the control system 10 in FIG. 2 may each have a basic configuration similar to that of the traveling control apparatus 15 in FIG. 3.

The input-output device 41 may be coupled to the vehicle network. The input-output device 41 may control input and output of information via the vehicle network. The input-output device 41 may acquire, for example, a packet with an ID corresponding to the own control apparatus added thereto, from the vehicle network, and output the packet to the ECU 44 via the internal bus 45. The input-output device 41 may add, for example, a sender ID corresponding to the own control apparatus and a destination ID to information acquired from the ECU 44 via the internal bus 45, and output the information to the vehicle network.

The timer 42 may measure a time and a time period. The time of the timer 42 may be calibrated by the current time obtained by the GNSS receiver 25 of the control system 10 of the vehicle 3.

The memory 43 may include, for example, a nonvolatile semiconductor memory, a hard disk drive (HDD), or a random access memory (RAM). The memory 43 may hold, for example, a program to be executed by the ECU 44, and data. The memory 43 of the traveling control apparatus 15 may hold, together with a program for traveling control, for example, a setting value of the traveling control, the detection information obtained by the detection control apparatus 16, the operation information obtained by the operation detection apparatus 14, and high-precision map data 46. The high-precision map data 46 may be data acquired from the server 31 and stored by the external communication apparatus 17. In one embodiment, the high-precision map data 46 may serve as "map data".

The high-precision map data 46 may include information richer than existing map data for route guidance guiding the vehicle 3 along a route to a set destination. The high-precision map data 46 may include, for example, not only link information on a road or lane on which the vehicle 3 is able to travel, but also information such as a shape of the road or lane or a shape of an intersection. The high-precision map data 46 may include, as other examples, information on various structures, including the traffic light 61, the zebra zone 62, the stop line 63, the traffic marking 64, the road sign 65, the building 69, the utility pole 68, the signboard 66, and the border pole 67, recognizable in the captured image obtained by the vehicle outside camera 26 of the vehicle 3. The information on the structure may include a kind of the structure, information for uniquely identifying the structure or identifying at least, for example, the kind of the structure, and a position of the structure. As a result, the high-precision map data 46 described above includes information such as the positions of multiple standing structures provided to stand along a road on which the vehicle 3 travels.

The ECU 44 may read the program held by the memory 43 and execute the program. This enables a processor to be implemented.

The ECU 44 may generate a control value to control the traveling of the vehicle 3, and output the control value to the driving control apparatus 11, the steering control apparatus 12, and the braking control apparatus 13.

Figure 4:
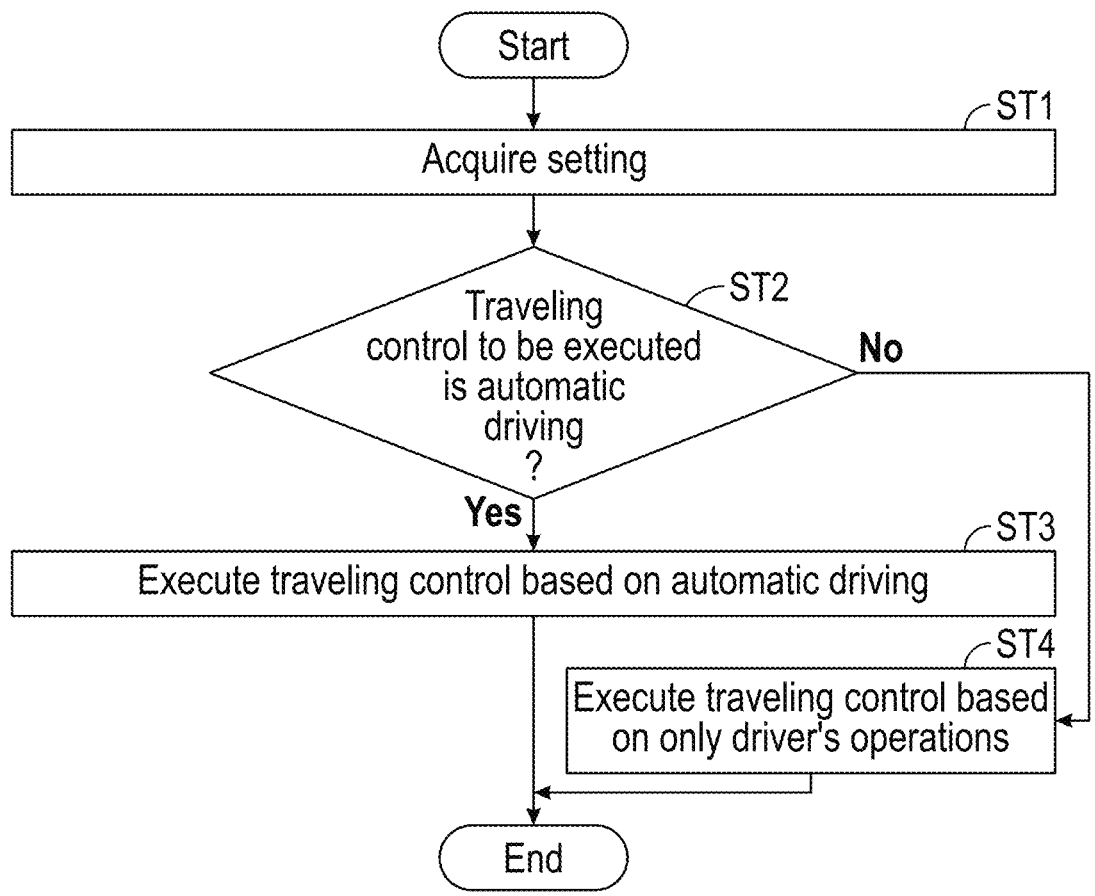
FIG. 4 is a flowchart illustrating traveling control to be performed by the control system of the vehicle in FIG. 2.

FIG. 4 is a flowchart illustrating traveling control to be performed by the control system 10 of the vehicle 3 in FIG. 2.

For example, the ECU 44 of the traveling control apparatus 15 in FIG. 2, serving as the processor, may repeatedly execute the traveling control of the vehicle 3 in FIG. 4.

This enables the control system 10 of the vehicle 3 to serve as the vehicle position generation apparatus to be provided in the vehicle 3.

Note that the traveling control of the vehicle 3 in FIG. 4 may be executed by the ECU 44 of another control apparatus, other than the traveling control apparatus 15, provided in the control system 10 of the vehicle 3.

In another example, the traveling control of the vehicle 3 in FIG. 4 may be executed by cooperation of the ECUs 44 of multiple control apparatuses provided in the control system 10 of the vehicle 3.

In step ST1, the ECU 44 may acquire setting of the traveling control of the vehicle 3. The ECU 44 may acquire information from each unit of the control system 10 for the traveling control of the vehicle 3. The ECU 44 may acquire similar information from the memory 43. Examples of the setting for the traveling control may include setting of an automatic driving level.

In step ST2, the ECU 44 may determine whether the traveling control to be executed is automatic driving, on the basis of the acquired information on the setting. The automatic driving may include driving assistance. If the setting is automatic driving (step ST2: Y), the ECU 44 may cause the flow to proceed to step ST3. Otherwise (step ST2: N), the ECU 44 may cause the flow to proceed to step ST4.

In step ST3, the ECU 44 may execute the traveling control based on automatic driving including driving assistance. In the traveling control for automatic driving, the ECU 44 may acquire, for example, a route toward a set destination, the high-precision map data 46, and the detection information such as the current position, without information on the driver's operations, and generate a course of the vehicle 3 on the basis of the acquired information. The detection information may include, for example, the captured image of the forward side obtained by the vehicle outside camera 26. The ECU 44 may acquire information including the route and the high-precision map data 46 from the memory 43. Further, the ECU 44 may generate, for example, a course that allows the vehicle 3 to safely travel along the route to the destination from the current position of the vehicle 3 generated by the GNSS receiver 25. The ECU 44 may generate a control value for traveling in the generated course, and output the control value to the driving control apparatus 11, the steering control apparatus 12, and the braking control apparatus 13. In the traveling control based on automatic driving, the ECU 44 may execute control such as lane keep control, preceding-vehicle following control, change of a traveling lane, merging or branching control in a merging section involving branching, obstacle avoidance, or emergency stop. The ECU 44 may select at least one of these various controls, to control the traveling in the generated course. Thereafter, the ECU 44 may end this control.

In step ST4, the ECU 44 may execute traveling control based on only the driver's operations. In this case, the ECU 44 may generate, on the basis of the driver's operation acquired from the operation detection apparatus 14, a control value corresponding to the operation, and output the control value to the driving control apparatus 11, the steering control apparatus 12, and the braking control apparatus 13. Thereafter, the ECU 44 may end this control.

As described above, the traveling control apparatus 15 may execute traveling control of the vehicle 3 based on the driver's operations, traveling control of the vehicle 3 assisting the driver's operations, and traveling control under automatic driving without the driver's operations.

To execute the traveling control based on automatic driving, the vehicle 3 is to acquire a highly accurate position as the current position of the vehicle 3. If the acquired current position is deviated from the actual position of the vehicle 3, the actual course of the vehicle 3 based on the traveling control will also be deviated.

In addition, in a case of continuously executing the traveling control based on automatic driving, the vehicle 3 may have to repeatedly acquire the current position of the vehicle 3 in a relatively short cycle.

Therefore, the vehicle 3 may use the GNSS receiver 25 that is able to generate a highly accurate position.

However, the vehicle 3 does not always travel on a road, for example, where the GNSS receiver 25 is able to favorably receive radio waves from the GNSS satellites. The vehicle 3 travels in a place such as a tunnel, a valley between the buildings 69, or a road in a forest in some cases. In these traveling situations, the GNSS receiver 25 is not always able to receive the radio waves of the GNSS satellites. Even if the GNSS receiver 25 is able to receive the radio waves of the GNSS satellites, accuracy of the position generated on the basis of the radio waves can be low. The vehicle 3 can thus be unable to obtain the current position, or unable to obtain a reliable current position.

In the traveling control of the vehicle 3, it may be desired to keep acquiring the current position with sufficient accuracy usable for the traveling control based on automatic driving, regardless of the traveling situation of the vehicle 3. The position of the vehicle 3 is to be improved in reliability, regardless of the traveling situation of the vehicle 3.

Figure 5:
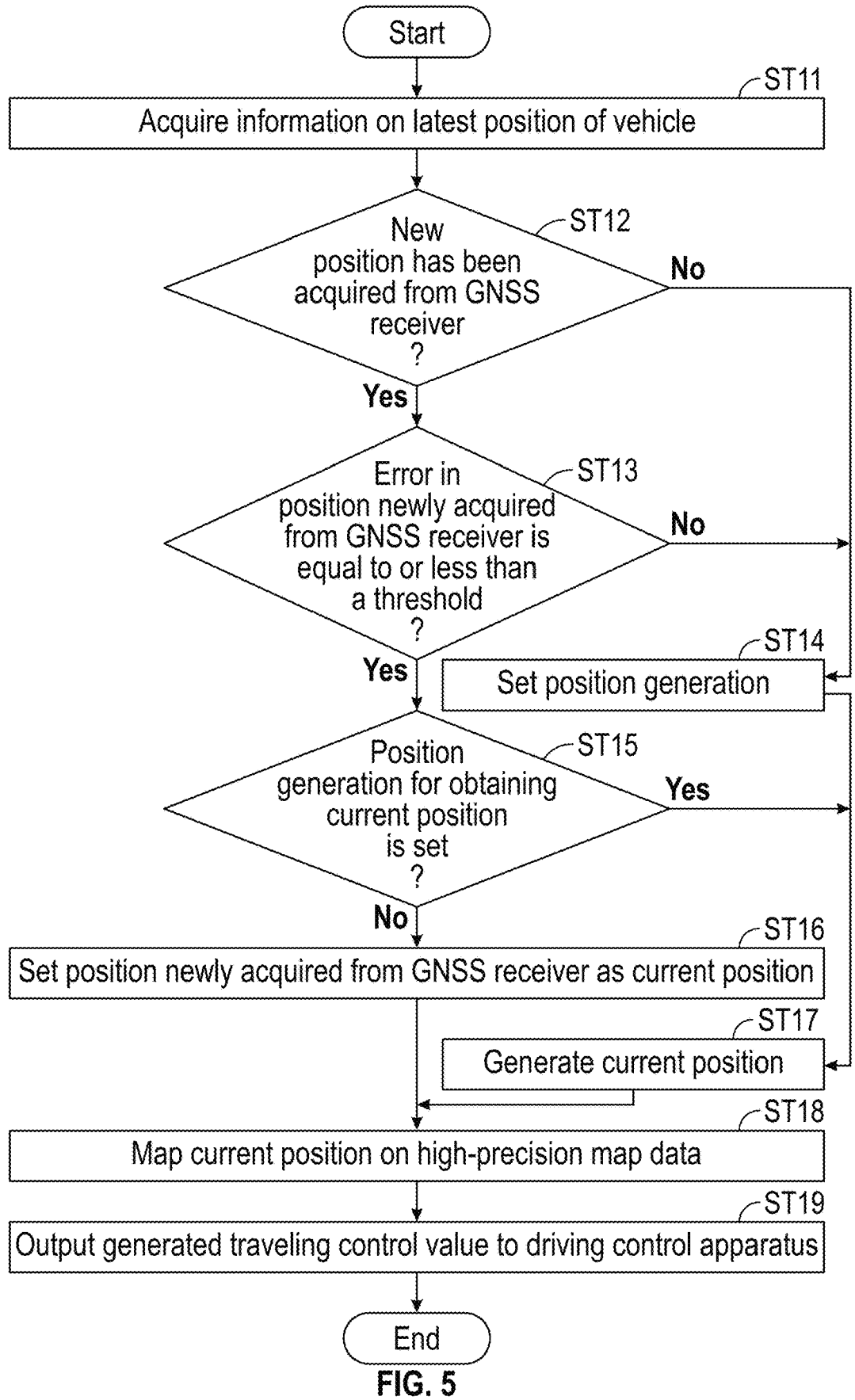
FIG. 5 is a flowchart illustrating traveling control based on automatic driving in FIG. 4.

FIG. 5 is a flowchart illustrating the traveling control based on automatic driving in FIG. 4.

The ECU 44 of the traveling control apparatus 15 in FIG. 2 may execute, in step ST3 in FIG. 4, the traveling control based on automatic driving in FIG. 5.

In step ST11, the ECU 44 may acquire information on the latest position of the vehicle 3 from the GNSS receiver 25.

In step ST12, the ECU 44 may determine whether a new position different from the previous position has been acquired from the GNSS receiver 25. When the GNSS receiver 25 successfully receive new radio waves, the GNSS receiver 25 may basically generate a new position and update the position. When the GNSS receiver 25 does not successfully receive new radio waves, the GNSS receiver 25 may be unable to update the position. Alternatively, the GNSS receiver 25 may be unable to generate a significant position by an update process. For example, if the position newly acquired this time is a significant position, and different from a position acquired in the previous process (step ST12: Y), the ECU 44 may determine that a new position has been acquired, and cause the flow to proceed to step ST13. If the ECU 44 does not determine that a new position has been acquired (step ST12: N), the ECU 44 may cause the flow to proceed to step ST14, to refrain from using the position newly acquired from the GNSS receiver 25 as the current position.

In step ST13, the ECU 44 may determine the accuracy of the position newly acquired from the GNSS receiver 25. For example, the ECU 44 may determine whether an error in the position newly acquired from the GNSS receiver 25 is equal to or less than a threshold for the error. The GNSS receiver 25 may typically, in a case of generating a position, also generate an error range of the position. The threshold for the error range may be, for example, a radius of several tens of centimeters. If the error in the position acquired from the GNSS receiver 25 is equal to or less than the threshold (step ST13: Y), the ECU 44 may cause the flow to proceed to step ST15. If the error in the acquired position is greater than the threshold (step ST13: N), the ECU 44 may cause the flow to proceed to step ST14, to refrain from using the position newly acquired from the GNSS receiver 25 as the current position.

In step ST14, the ECU 44 may set position generation for obtaining the current position. For example, the ECU 44 may, store a position generation flag having a predetermined value in the memory 43. The value of the position generation flag may be either of a value that enables the position generation for obtaining the current position, and a value that disables the position generation. Thereafter, the ECU 44 may cause the flow to proceed to step ST17.

In step ST15, the ECU 44 may determine whether the position generation for obtaining the current position is set. For example, the ECU 44 may acquire the value of the position generation flag held by the memory 43. If the position generation flag is the setting value for the position generation (step ST15: Y), the ECU 44 may cause the flow to proceed to step ST17. The ECU 44 may cause the flow to proceed to step ST17 in a period in which the value of the position generation flag is set at the setting value for the position generation. If the value of the position generation flag is the setting value for non-execution of the position generation (step ST15: N), the ECU 44 may cause the flow to proceed to step ST16.

In step ST16, the ECU 44 may set the position newly acquired from the GNSS receiver 25 as the current position. Thereafter, the ECU 44 may cause the flow to proceed to step ST18.

In step ST17, the ECU 44 may generate the current position. In this case, the ECU 44 may generate, as the current position, a position calculated by any of various methods to be described later, instead of using the position newly acquired from the GNSS receiver 25 as the current position as it is.

In step ST18, the ECU 44 may map the current position on the high-precision map data 46, generate a course of the vehicle 3 for traveling from the current position, and generate a traveling control value for traveling in the generated course.

In step ST19, the ECU 44 may output the generated traveling control value to the driving control apparatus 11, the steering control apparatus 12, and the braking control apparatus 13. This enables the vehicle 3 to travel on the basis of automatic driving.

Figure 6:
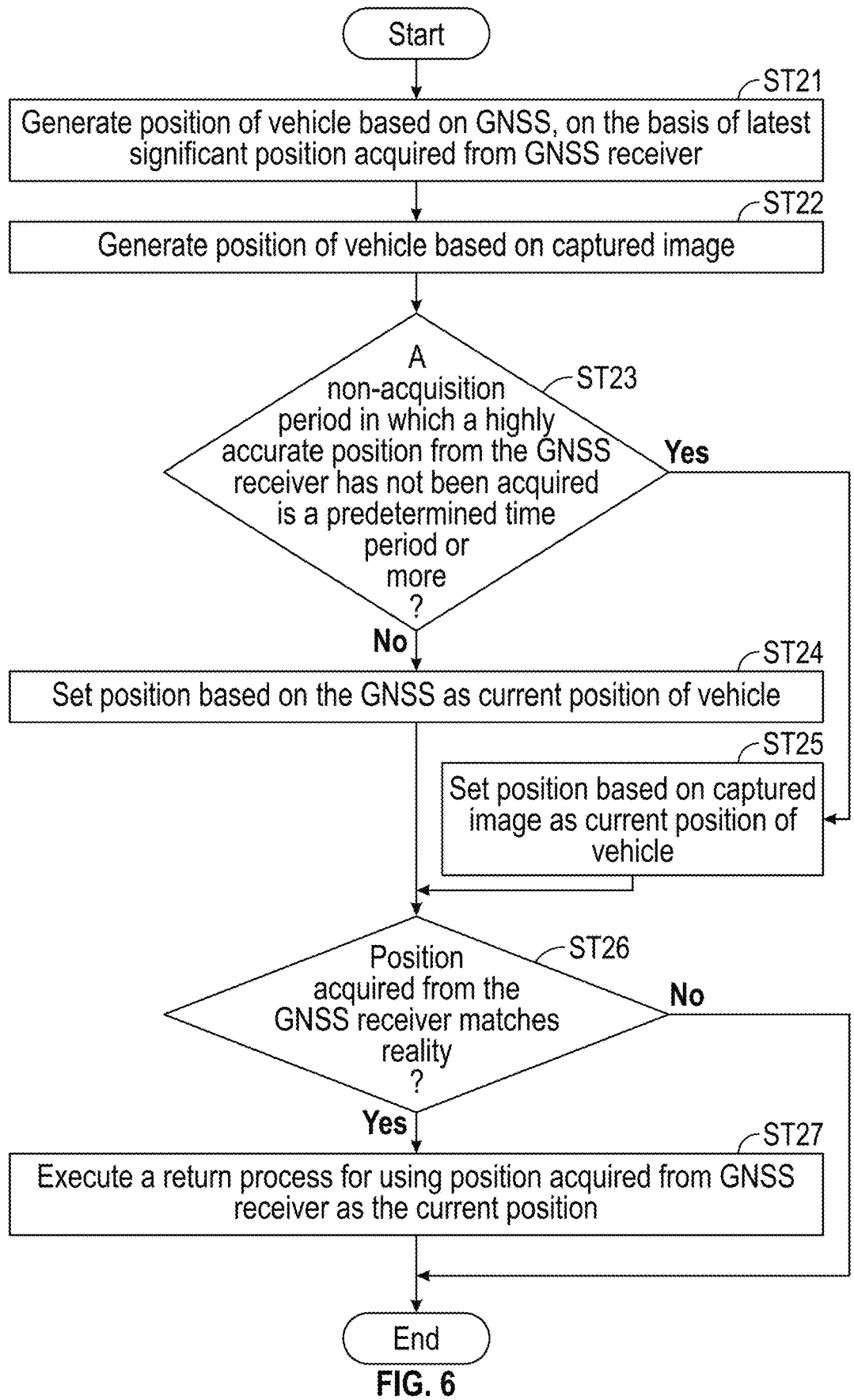
FIG. 6 is a flowchart illustrating a current position generation process in FIG. 5.

FIG. 6 is a flowchart illustrating a current position generation process in FIG. 5.

The ECU 44 of the traveling control apparatus 15 in FIG. 2 may execute, in step ST17 in FIG. 5, the current position generation process in FIG. 6.

In step ST21, the ECU 44 may generate the position of the vehicle 3 based on a GNSS, on the basis of the latest significant position acquired from the GNSS receiver 25.

When a new position has not been acquired from the GNSS receiver 25, the ECU 44 may use the latest significant position acquired from the GNSS receiver 25 earlier. The ECU 44 may generate the position of the vehicle 3 on the basis of a history of movement from the latest significant acquired position. The ECU 44 may acquire a movement distance and a movement direction from the latest significant acquired position, from the detection control apparatus 16 or the memory 43. The detection control apparatus 16 may time-integrate the front-rear, left-right, and up-down accelerations detected by the acceleration sensor 28 to generate a speed of the vehicle 3. The detection control apparatus 16 may time-integrate the speed of the vehicle 3 to generate the movement distance. The memory 43 may hold such information based on detection by the detection member and acquired from the detection control apparatus 16. On the basis of these movement histories, the ECU 44 may calculate the movement distance and the movement direction of the vehicle 3 from the latest significant acquired position, and generate the position of the vehicle 3 based on the GNSS.

When a position that is significant but can have insufficient accuracy has been acquired from the GNSS receiver 25, the ECU 44 may set the acquired position as the position of the vehicle 3 based on the GNSS.

Also when a position that is significant and has high accuracy has begun to be acquired from the GNSS receiver 25, the ECU 44 may set the acquired position as the position of the vehicle 3 based on the GNSS.

In step ST22, the ECU 44 may generate the position of the vehicle 3 based on the captured image, on the basis of the captured image obtained by the vehicle outside camera 26 serving as the detection member. The ECU 44 may extract a structure such as the utility pole 68 included in the captured image, and generate the position of the vehicle 3, with respect to the position of the extracted structure in the high-precision map data 46, to allow an angle-of-view position of the structure to be obtained in a provisional captured image assumed to be obtained by the vehicle outside camera 26 in the high-precision map data 46. Here, a distance between the structure and the vehicle 3 in the high-precision map data 46 may be a distance from the structure extracted from the captured image to the vehicle 3. Details will be described later.

In step ST23, the ECU 44 may determine whether a non-acquisition period in which a highly accurate position from the GNSS receiver 25 has not been acquired is a predetermined time period or more. For example, the ECU 44 may instruct the timer 42 to start measurement in the process of step ST14 in FIG. 5, and may acquire a time period measured by the timer 42 at a process timing of step ST23 as the non-acquisition period. The predetermined time period to be compared with the non-acquisition period may be, for example, a time period in which the error range of the position of the vehicle 3 based on the GNSS generated in step ST21 is estimated to exceed a radius of 1 meter. If the non-acquisition period is not the predetermined time period or more (step ST23: N), the ECU 44 may cause the flow to proceed to step ST24. If the non-acquisition period is the predetermined time period or more (step ST23: Y), the ECU 44 may cause the flow to proceed to step ST25.

In step ST24, the ECU 44 may set the position based on the GNSS generated in step ST21 as the current position of the vehicle 3. Thereafter, the ECU 44 may cause the flow to proceed to step ST26.

In step ST25, the ECU 44 may set the position based on the captured image generated in step ST22 as the current position of the vehicle 3. Thereafter, the ECU 44 may cause the flow to proceed to step ST26.

In step ST26, the ECU 44 may determine whether the position acquired this time from the GNSS receiver 25 matches reality.

The ECU 44 may map the position acquired this time from the GNSS receiver 25 on the high-precision map data 46, and determine whether a virtual image in the high-precision map data 46 assumed to be captured from the mapped position match the captured image obtained by the vehicle outside camera 26. For example, the ECU 44 may determine whether the angle-of-view position of a standing structure such as the utility pole 68 in the image matches between the compared images. If the ECU 44 determines that the angle-of-view position matches (step ST26: Y), the ECU 44 may determine that the position acquired this time from the GNSS receiver 25 matches reality, and cause the flow to proceed to step ST27. Otherwise (step ST26: N), the ECU 44 may end this control, without causing the flow to proceed to step ST27.

In step ST27, the ECU 44 may execute a return process for using the position acquired from the GNSS receiver 25 as the current position. The ECU 44 may update, with the value that disables the position generation, the value of the position generation flag set in step ST14 in FIG. 5 to continuously execute the current position generation process in FIG. 6. This allows the ECU 44 to, in step ST15, determine that the position generation for obtaining the current position is not set, and cause the flow to proceed to step ST16. Thereafter, the ECU 44 may end this control.

As described above, in the current position generation process in FIG. 6, the ECU 44 may generate, as the current position, the position based on the captured image generated in step ST22 or the position based on the GNSS generated in step ST21.

Further, in the control in FIGS. 5 and 6, when the predetermined time period elapses after determining that no position information is provided from the GNSS receiver 25, the ECU 44 may start the generation of the current position of the vehicle 3 based on the captured image obtained by the vehicle outside camera 26. In one embodiment, the GNSS receiver 25 may serve as a "position information generation device".

In another example, when the predetermined time period elapses after determining that the error range of the position information provided from the GNSS receiver 25 is wider than the threshold, i.e., reliability of the position information is not high, the ECU 44 may start the generation of the current position of the vehicle 3 based on the captured image obtained by the vehicle outside camera 26.

In this manner, the ECU 44 may determine quality of the position information from the GNSS receiver 25, and when a predetermined time period elapses in a state in which the quality of the position information is not high, may start the generation of the current position of the vehicle 3 based on the captured image obtained by the vehicle outside camera 26. Thus, when a dead reckoning state in which highly accurate position information is not obtained from the GNSS receiver 25 continues, the ECU 44 may switch the current position of the vehicle 3 to the current position based on the captured image obtained by the vehicle outside camera 26. The dead reckoning state continuing for a long time can result in a decrease in the accuracy of the position obtained by calculation of the amount of movement from, for example, the latest highly accurate position obtained by the GNSS receiver 25.

The ECU 44 may keep generating the position based on the captured image obtained by the vehicle outside camera 26, as the current position of the vehicle 3, at least until a position and orientation of the vehicle 3 provided from the GNSS receiver 25 or a position and orientation based on the provided position and orientation return to a highly accurate position and orientation. The highly accurate position and orientation may be a position and orientation accurate enough to make a relative position relationship with the structure identified in the high-precision map data 46 match the angle-of-view position of the identified structure in the captured image obtained by the vehicle outside camera 26. At least in the period in which a highly accurate position is not obtained from the GNSS receiver 25, the vehicle 3 may use, for traveling control of the vehicle 3, the position based on the captured image, for example, which is likely to be more reliable than the position obtained from the GNSS receiver 25.

In addition, after the position of the vehicle 3 obtained by the GNSS receiver 25 returns to a highly accurate position, the ECU 44 may execute highly accurate traveling control by using the highly accurate position.

Figure 7:
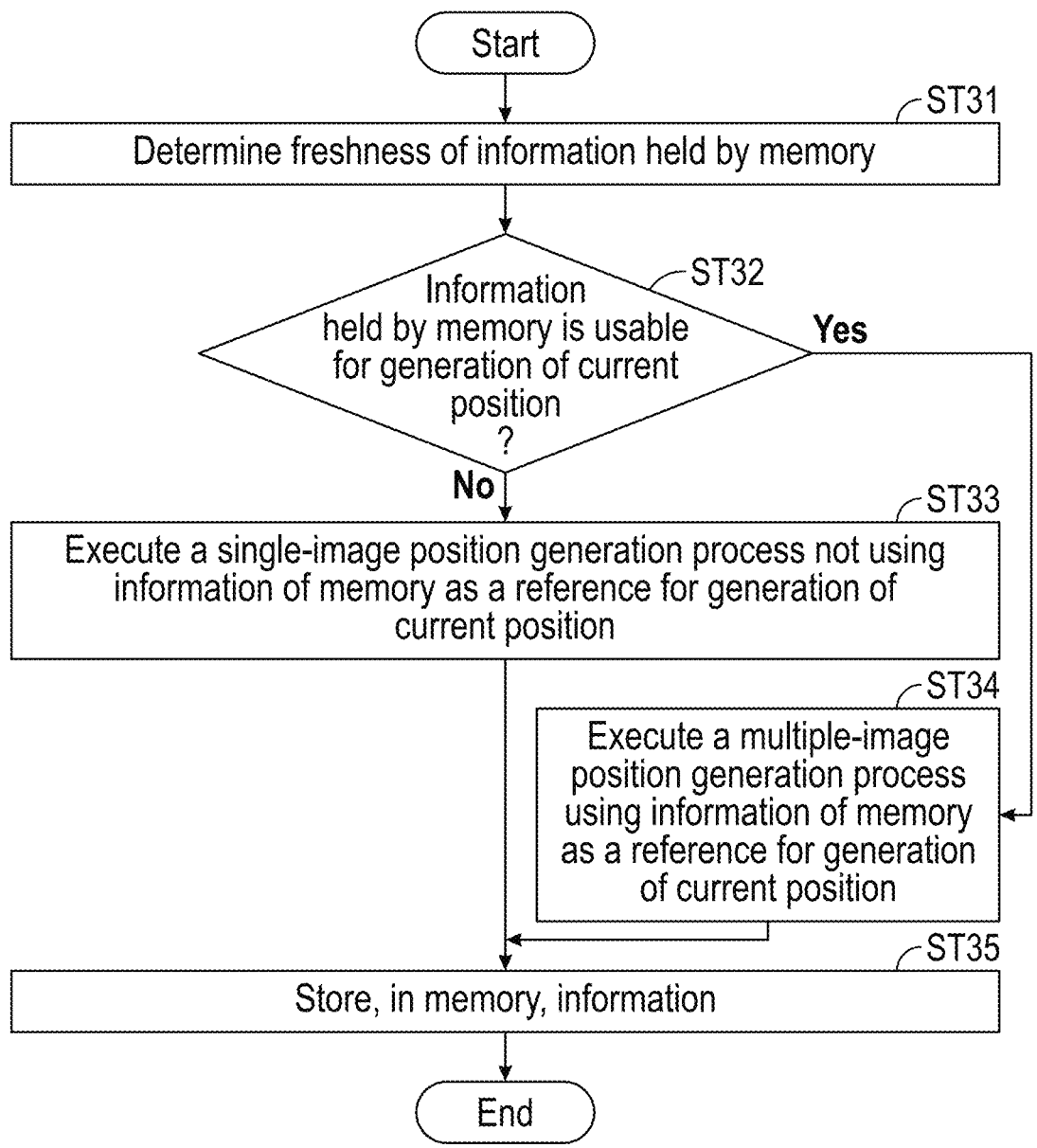
FIG. 7 is a flowchart illustrating a current position generation process based on a captured image in FIG. 6.

FIG. 7 is a flowchart illustrating a current position generation process based on the captured image in FIG. 6.

The ECU 44 of the traveling control apparatus 15 in FIG. 2 may execute, in step ST22 in FIG. 6, the current position generation process based on the captured image in FIG. 7.

It is assumed here that the memory 43 holds information to be used for the process in FIG. 7, including information on the utility pole 68 serving as the standing structure extracted from the past captured image, the past position of the vehicle 3 corresponding to the past captured image, and the amount of movement from the past position of the vehicle 3. The memory 43 may also hold information on a structure other than the utility pole 68. The amount of movement may be the movement distance and the movement direction.

In step ST31, the ECU 44 may determine freshness of the information held by the memory 43.

For example, the ECU 44 may determine the freshness of the information, on the basis of elapsed time between a storage time associated with the past information in the memory 43, and the current time of the timer 42.

In another example, the ECU 44 may determine the freshness of the information, on the basis of a separation distance between the past position held by the memory 43, and the position based on the GNSS generated in step ST21 in FIG. 5.

In step ST32, the ECU 44 may determine whether the information held by the memory 43 is usable for generation of the current position.

For example, if the elapsed time of the information is a predetermined threshold or more and the information is old (step ST32: N), the ECU 44 may cause the flow to proceed to step ST33, to refrain from using the information of the memory 43 for generation of the current position. If the elapsed time of the information is less than the predetermined threshold (step ST32: Y), the ECU 44 may cause the flow to proceed to step ST34, to use the information of the memory 43 for generation of the current position.

In another example, if the separation distance of the information is a predetermined threshold or more and the information is old (step ST32: N), the ECU 44 may cause the flow to proceed to step ST33, to refrain from using the information of the memory 43 for generation of the current position. If the separation distance of the information is less than the predetermined threshold (step ST32: Y), the ECU 44 may cause the flow to proceed to step ST34, to use the information of the memory 43 for generation of the current position.

In step ST33, the ECU 44 may execute a single-image position generation process not using the information of the memory 43 as a reference for generation of the current position. For example, the ECU 44 may generate the position of the vehicle 3 by using, as the reference for the position, one utility pole 68 included in the captured image obtained by the vehicle outside camera 26. Thereafter, the ECU 44 may cause the flow to proceed to step ST35.

In step ST34, the ECU 44 may execute a multiple-image position generation process using the information of the memory 43 as a reference for generation of the current position. The memory 43 may hold, for example, information on the utility pole 68 extracted from the past captured image. For example, the ECU 44 may generate the position of the vehicle 3 by using, as the reference for the position, one utility pole 68 included in the captured image obtained by the vehicle outside camera 26, and the utility pole 68 included in the past captured image held by the memory 43.

In step ST35, the ECU 44 may store, in the memory 43, the information generated in the process in FIG. 7 this time. Thus, information based on the past captured image may be stored and accumulated in the memory 43.

As described above, the ECU 44 may select, depending on the freshness of the information of the memory 43, one of the multiple-image position generation process using the information of the memory 43 and the single-image position generation process not using the information of the memory 43, and generate the position of the vehicle 3 by the selected process.

In the example embodiment, when the reliability of the position based on the GNSS is low, it is possible to ensure constant reliability of the current position of the vehicle 3, by using a position based on a single captured image or multiple captured images as the current position of the vehicle 3.

A detailed description is given next of generation of a position based on a single captured image or multiple captured images.

It is assumed here that the high-precision map data 46 includes information on at least the position of a structure provided on the road on which the vehicle 3 travels or near the road. The high-precision map data 46 may include at least information on the positions of the utility poles 68, poles, and other standing structures arranged to stand along the road on which the vehicle 3 travels. Examples of the poles may include the border poles 67, and the poles supporting the traffic light 61 and the road sign 65.

Road surface drawn objects including the zebra zone 62, the stop line 63, and the traffic marking 64, recognizable in the captured image obtained by the vehicle outside camera 26 of the vehicle 3, may be drawn on the road on which the vehicle 3 travels.

The traffic light 61 and the road sign 65 may be provided at a place such as the intersection of the road on which the vehicle 3 travels.

The signboard 66 and the utility pole 68, for example, may be provided near the road on which the vehicle 3 travels.

Of these structures, structures including the road surface drawn object, the traffic light 61, the road sign 65, and the signboard 66 tend not to be clearly imaged in the image when snow is accumulated. The road surface drawn object tends not to be clearly imaged in the image also when the road surface is frozen.

Even if the ECU 44 tries to analyze the captured image obtained by the vehicle outside camera 26 and extract a structure, the ECU 44 can be unable to extract a structure whose original shape or outline is not clearly imaged in the captured image.

In contrast, standing structures, including the poles supporting the traffic light 61 and the road sign 65, and the utility pole 68, are at least partly able to be clearly imaged in the image even if snow is accumulated or the road surface is frozen. The ECU 44 is able to extract the standing structure such as the utility pole 68 by analyzing the captured image obtained by the vehicle outside camera 26. The standing structure such as the utility pole 68 is extractable with higher probability than other structures. In the example embodiment, consideration may be given to such a difference in ease of extraction resulting from a difference in kind of the structure. The high-precision map data 46 in the example embodiment may include at least information on the positions of the utility poles 68, poles, and other standing structures arranged to stand along the road on which the vehicle 3 travels.

In addition, when the ECU 44 has extracted a standing structure such as the utility pole 68 on the basis of the past captured image, the memory 43 may hold information on the standing structure such as the utility pole 68 extracted in the past.

The following description takes, as an example, a case of using the utility pole 68 imaged in the captured image for generation of the current position. The following description is similarly applicable to standing structures other than the utility pole 68, and other structures.

Figure 8:
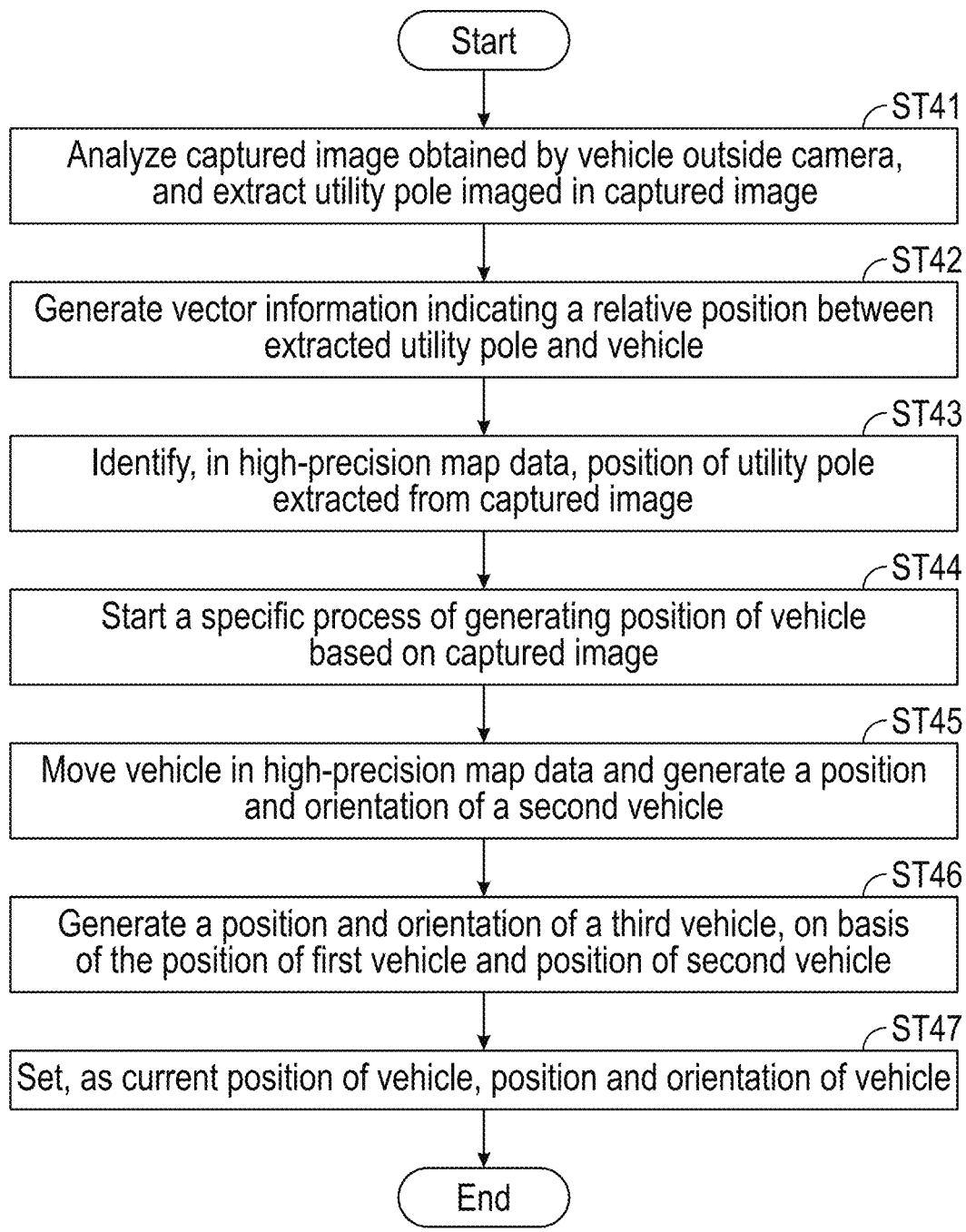
FIG. 8 is a flowchart illustrating a current position generation process based on a single image in FIG. 7.

FIG. 8 is a flowchart illustrating a current position generation process based on a single image in FIG. 7.

The ECU 44 of the traveling control apparatus 15 in FIG. 2 may execute, in step ST33 in FIG. 7, the single-image position generation process in FIG. 8.

In step ST41, the ECU 44 may analyze the captured image obtained by the vehicle outside camera 26, and extract the utility pole 68 imaged in the captured image.

In addition, the ECU 44 may determine the kind of the extracted structure as the utility pole 68, or extract a feature of the utility pole 68 itself.

In step ST42, the ECU 44 may generate vector information indicating a relative position between the extracted utility pole 68 and the vehicle 3.

When the vehicle outside camera 26 is a stereo camera, for example, the ECU 44 may calculate a relative distance from the own vehicle to the standing structure, on the basis of an image position of the utility pole 68 in the captured image and parallax between multiple captured images. An error in the relative distance may be reduced depending on, for example, resolution of the vehicle outside camera 26. The error may be smaller when the vehicle outside camera 26 is a stereo camera than when the vehicle outside camera 26 is a monocular camera.

In addition, the ECU 44 may calculate a relative direction of the standing structure with respect to the vehicle outside camera 26 of the own vehicle, on the basis of the image position of the utility pole 68 in the captured image and the parallax between multiple captured images. The relative direction of the utility pole 68 may be information on the angle-of-view position as imaged from the vehicle 3.

This enables the ECU 44 to generate a relative position vector between the extracted utility pole 68 and the vehicle 3.

In addition, the ECU 44 may provisionally generate a position of the relative position vector from the own vehicle, as an approximate position of the utility pole 68.

The ECU 44 may generate information on the utility pole 68 included in the captured image obtained by the vehicle outside camera 26.

Note that the ECU 44 may generate the information on the utility pole 68 included in the captured image obtained by the vehicle outside camera 26, by using the outside-vehicle spatial information obtained by the LiDAR 27, together with the captured image obtained by the vehicle outside camera 26.

In step ST43, the ECU 44 may identify, in the high-precision map data 46, the position of the utility pole 68 extracted from the captured image.

For example, the ECU 44 may identify, out of the utility poles 68 included in the high-precision map data 46, the utility pole 68 present in a direction of the relative position vector from the provisionally estimable own vehicle position, as the extracted utility pole 68 in the high-precision map data 46.

In another example, the ECU 44 may identify, out of the utility poles 68 included in the high-precision map data 46, the utility pole 68 nearest to the approximate position of the utility pole 68, as the extracted utility pole 68 in the high-precision map data 46.

In another example, the ECU 44 may repeatedly execute the process of extracting the utility pole 68, for the captured images repeatedly generated by the vehicle outside camera 26 during traveling. In this case, the ECU 44 is able to keep correctly identifying the utility pole 68 that is able to be imaged at that time in the captured image obtained in a period in which a highly accurate position based on the GNSS is obtained. By thus executing this process in a state in which the past utility pole 68 is kept being correctly identified, the ECU 44 is able to correctly identify the utility pole 68 relevant to the process, even when multiple utility poles 68 that are able to be imaged are present in the high-precision map data 46. The ECU 44 is able to correctly identify the utility pole 68 this time in the high-precision map data 46, on the basis of a relative position relationship between the extracted utility poles 68.

This enables the ECU 44 to identify, in the high-precision map data 46, the position of the utility pole 68 as a single standing structure included in the latest captured image obtained by the vehicle outside camera 26.

From step ST44, the ECU 44 may start a specific process of generating the position of the vehicle 3 based on the captured image. In the example embodiment, the ECU 44 may generate the current position of the vehicle 3 by the single-image position generation process based on the captured image obtained by the vehicle outside camera 26, by three-step processes of a first generation process in step ST44, a second generation process in step ST45, and a third generation process in step ST46.

In the first generation process in step ST44, the ECU 44 may move the vehicle 3 in the high-precision map data 46 and generate a position and orientation of a first vehicle 94, on the basis of the relative position relationship, i.e., the relative distance and the relative direction, between the utility pole 68 and the vehicle 3.

In the second generation process in step ST45, the ECU 44 may move the vehicle 3 in the high-precision map data 46 and generate a position and orientation of a second vehicle 95, on the basis of the relative distance between the utility pole 68 and the vehicle 3.

In the third generation process in step ST46, the ECU 44 may generate a position and orientation of a third vehicle 97, on the basis of the position of the first vehicle 94 in step ST44 and the position of the second vehicle 95 in step ST45.

In step ST47, the ECU 44 may set, as the current position of the vehicle 3, the position and orientation of the vehicle 3 generated in the processes up to step ST46.

The ECU 44 may basically set the position and orientation of the third vehicle 97 as the current position of the vehicle 3.

In this manner, the ECU 44 is able to generate the current position of the vehicle 3, by the single-image position generation process based on only the captured image obtained by the vehicle outside camera 26.

A detailed description is given next of the first to third generation processes of the single-image position generation process, with reference to FIGS. 9 to 12.

The road on which the vehicle 3 actually travels may be present in a three-dimensional space. However, to simplify the description here, an X-Y two-dimensional space is used for the description.

Figure 9:
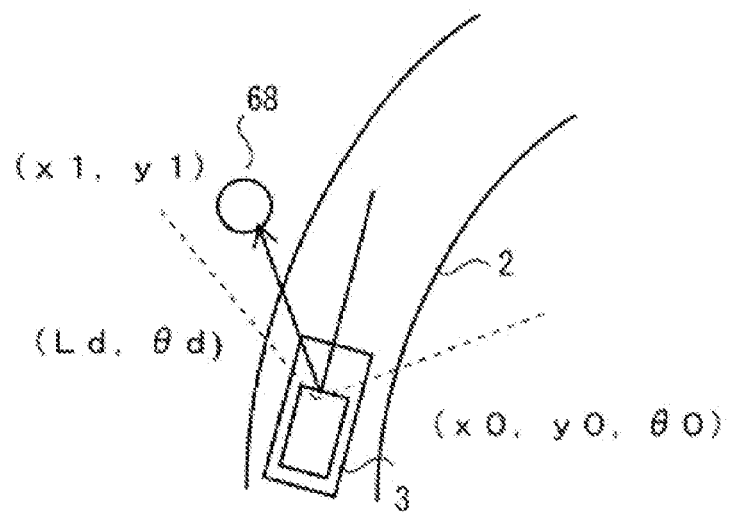
FIG. 9 is an explanatory diagram illustrating main information available in a current position generation process by a single-image position generation process.

FIG. 9 is an explanatory diagram illustrating main information available in the current position generation process by the single-image position generation process.

FIG. 9 illustrates the vehicle 3 traveling on the road 2 in the suburban area. The utility pole 68 may be provided to stand in left-front of the vehicle 3.

In this case, the ECU 44 is able to acquire information on the position and orientation (x0, y0, θ0) of the vehicle 3 based on the GNSS, a position (x1, y1) of the utility pole 68 identified in the high-precision map data 46, and a relative position vector (Ld, θd) from the vehicle 3 to the utility pole 68.

The position (x0, y0) of the vehicle 3 based on the GNSS may be any values associable with the high-precision map data 46, and may be, for example, latitude and longitude values.

The orientation θ0 of the vehicle 3 based on the GNSS may be any value associable with the high-precision map data 46, and may be, for example, an angle in a 360-degree direction with respect to geomagnetic north.

The relative position vector (Ld, θd) from the vehicle 3 to the utility pole 68 may be a vector generated on the basis of information such as the captured image or the spatial information obtained by the LiDAR 27. Ld may be a relative distance, and θd may be a relative angle. The relative angle may be, for example, an angle with respect to the front of the vehicle 3.

Figure 10:
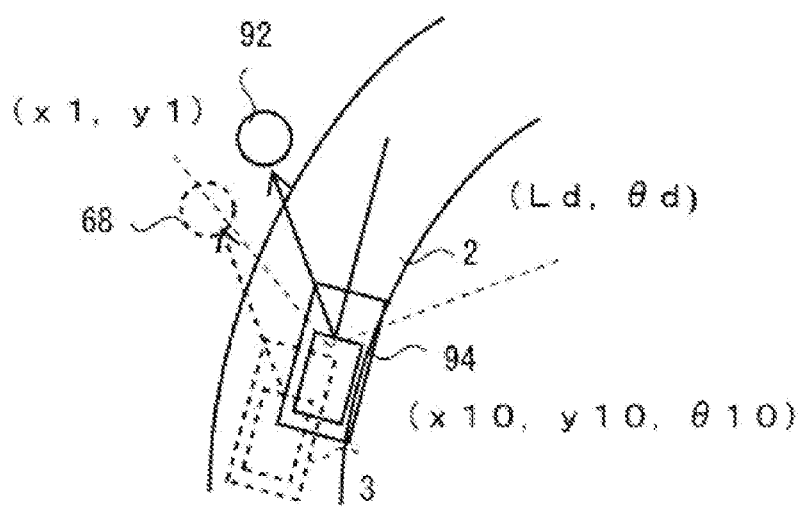
FIG. 10 is an explanatory diagram illustrating a method of generating a position and orientation of the vehicle by a first generation process in FIG. 8, in the single-image position generation process.

FIG. 10 is an explanatory diagram illustrating a method of generating the position and orientation of the vehicle 3 by the first generation process in FIG. 8 of the single-image position generation process.

In FIG. 10, for comparison, the vehicle 3 traveling on the road 2 in the suburban area and the utility pole 68 are indicated by dashed lines.

In FIG. 10, the identified utility pole 68 may be provided to stand in left-front of the vehicle 3 in the high-precision map data 46.

In the first generation process, the ECU 44 may generate, as the position and orientation (x10, y10, θ10) of the first vehicle 94, a position away from the position (x1, y1) of a utility pole 92 identified in the high-precision map data 46, by the relative position vector (Ld, θd).

In this case, the first vehicle 94 may be at a position translated from the dashed-line position measured by the GNSS receiver 25 serving as the detection member.

The position of the first vehicle 94 obtained by the first generation process may be a position away from the identified utility pole 92 by the relative distance Ld in a direction of the relative angle θd.

The orientation of the first vehicle 94 obtained by the first generation process may be a direction forming the relative angle θd with respect to a direction from the vehicle 3 at the position to the utility pole 92.

In this case, the ECU 44 may generate, as the current position of the vehicle 3, a position that allows the vehicle 3 to keep the orientation based on the angle-of-view position of the utility pole 92 serving as the identified standing structure in the captured image obtained by the vehicle outside camera 26, and have the distance from the utility pole 92 estimated from the captured image. This allows the current position of the vehicle 3 to be a reliable position close to the actual position as the relative position with respect to the utility pole 92. However, reliability of the orientation of the vehicle 3 is not increasable.

Figure 11:
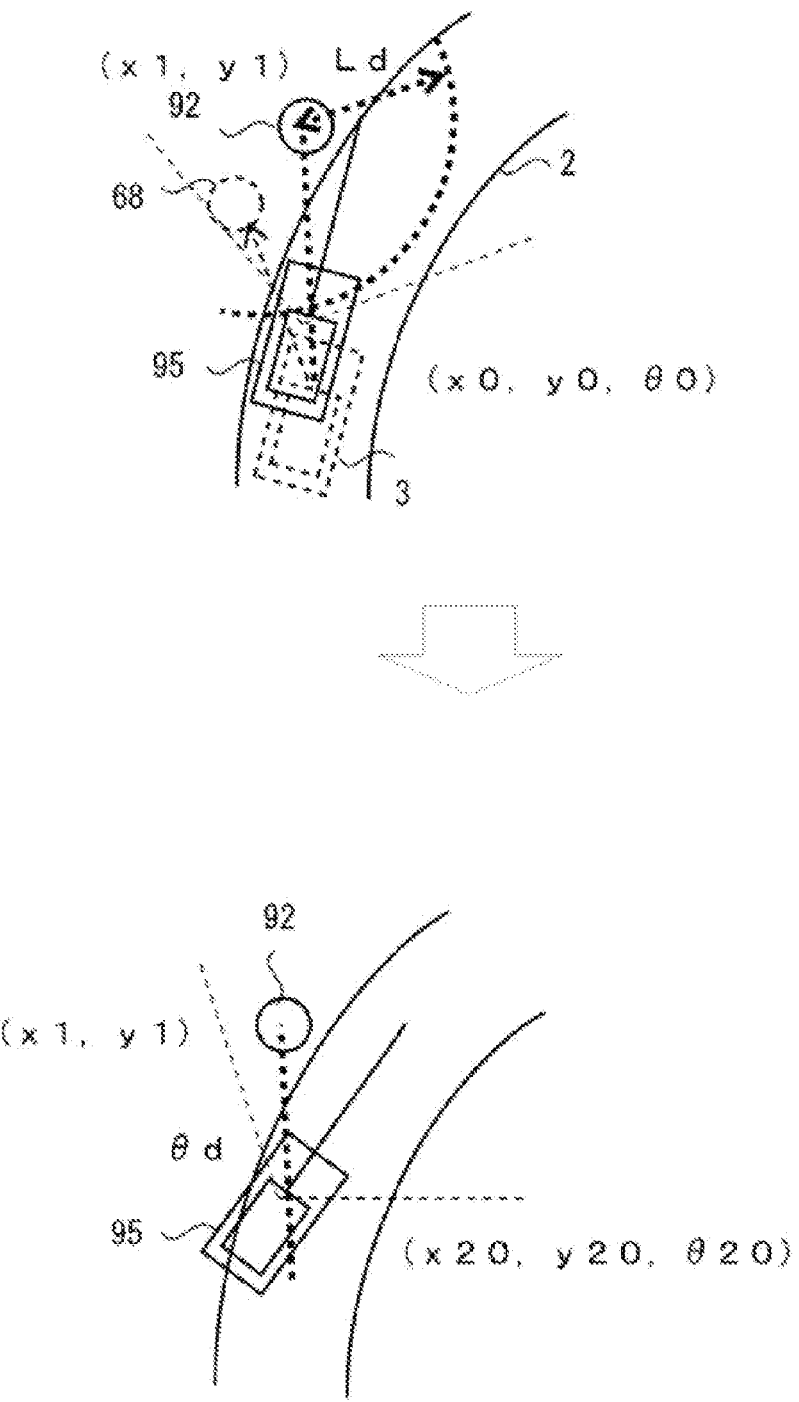
FIG. 11 is an explanatory diagram illustrating a method of generating a position and orientation of the vehicle by a second generation process in FIG. 8.

FIG. 11 is an explanatory diagram illustrating a method of generating the position and orientation of the vehicle 3 by the second generation process in FIG. 8.

In FIG. 11, for comparison, the vehicle 3 traveling on the road 2 in the suburban area and the utility pole 68 are indicated by dashed lines.

In FIG. 11, the identified utility pole 92 may be provided to stand in left-front of the vehicle 3 in the high-precision map data 46.

In the second generation process, the ECU 44 may first execute a position generation process of moving the position of the vehicle 3, as illustrated in an upper part of FIG. 11. In the position generation process, the ECU 44 may generate, with respect to the position (x1, y1) of the utility pole 92 identified in the high-precision map data 46 and the position (x0, y0) of the vehicle 3 based on the GNSS, a position between the positions as the position of the second vehicle 95. The position of the second vehicle 95 may be a position away from the position of the identified utility pole 92 by the relative distance Ld.

Thereafter, by an orientation generation process of turning the orientation of the vehicle 3, the ECU 44 may generate, as the orientation of the second vehicle 95, an orientation that allows a direction from the position of the second vehicle 95 toward the identified utility pole 92 to have the relative angle θd generated on the basis of the captured image, as illustrated in a lower part of FIG. 11.

In this manner, the ECU 44 may generate the position and orientation (x20, y20, θ20) of the second vehicle 95.

In this case, in the second generation process, the ECU 44 may generate, as the current position of the vehicle 3, a position that is between the position of the standing structure identified in the high-precision map data 46 and the provisional position based on the GNSS before correction, which can have an error, and has the relative distance Ld estimated from the captured image. In this case, the ECU 44 may further generate the orientation of the vehicle 3 to allow the angle-of-view position θd of the utility pole 68 serving as the identified standing structure in the captured image obtained by the vehicle outside camera 26 to be obtained at the generated current position.

Figure 12:
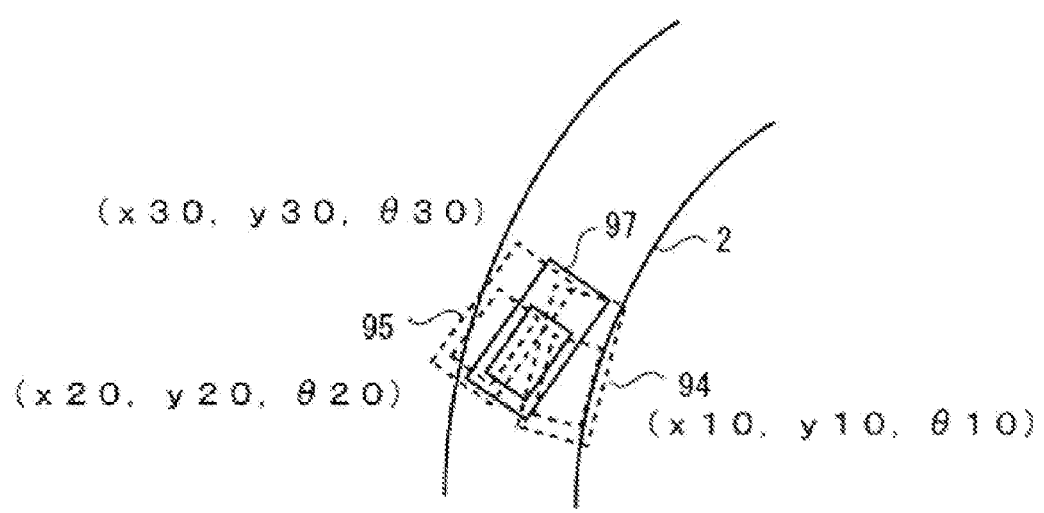
FIG. 12 is an explanatory diagram illustrating a method of generating a position and orientation of the vehicle by a third generation process in FIG. 8.

FIG. 12 is an explanatory diagram illustrating a method of generating the position and orientation of the vehicle 3 by the third generation process in FIG. 8.

In FIG. 12, for comparison, the position and orientation (x10, y10, θ10) of the first vehicle 94 and the position and orientation (x20, y20, θ20) of the second vehicle 95 are indicated by dashed lines.

The ECU 44 may generate, as the position of the third vehicle 97, a position between the position (x10, y10) of the first vehicle 94 and the position (x20, y20) of the second vehicle 95.

In addition, the ECU 44 may generate, as the orientation of the third vehicle 97, an orientation between the orientation θ10 of the first vehicle 94 and the orientation θ20 of the second vehicle 95.

A weighting ratio between a value of the first vehicle 94 and a value of the second vehicle 95 may be, for example, 0.5:0.5. In this case, a value of the third vehicle 97 may be an intermediate value between the value of the first vehicle 94 and the value of the second vehicle 95.

In this manner, the ECU 44 may generate the position and orientation (x30, y30, θ30) of the third vehicle 97. The ECU 44 may generate, as the position and orientation (x30, y30, θ30) of the third vehicle 97, the position and orientation between the position and orientation obtained by the first generation process and the position and orientation obtained by the second generation process.

As described above, the ECU 44 may generate the position and orientation (x30, y30, θ30) of the third vehicle 97 as the current position and orientation of the vehicle 3 based on the single image, by executing the series of processes in FIGS. 10 to 12.

In the single-image position generation process, the ECU 44 may identify, in the high-precision map data 46, the position of the utility pole 68 serving as the single standing structure included in the latest captured image obtained by the vehicle outside camera 26.

Further, the ECU 44 may generate the current position and orientation of the vehicle 3 in the high-precision map data 46, on the basis of only the utility pole 68 in the captured image obtained by the vehicle outside camera 26, without using the information on the past utility pole held by the memory 43.

The ECU 44 may generate the current position and orientation of the vehicle 3 in the high-precision map data 46 on the basis of the relative position of the utility pole 68 serving as the single standing structure in the captured image obtained by the vehicle outside camera 26.

This enables the ECU 44 to generate reliable current position and orientation of the vehicle 3, on the basis of the captured image obtained by the vehicle outside camera 26, without being influenced by the information on the past utility pole held by the memory 43.

The current position and orientation of the vehicle 3 generated by the single-image position generation process are able to be a reliable position and orientation suitable for traveling control of the vehicle 3. The current position and orientation of the vehicle 3 generated by the single-image position generation process may be a reliable position and orientation suitable for traveling control of the vehicle 3, as compared with the position and orientation based on the GNSS. The traveling of the vehicle 3 may be controlled by using the current position and orientation of the vehicle 3 generated by the single-image position generation process. It is expected that this allows the vehicle 3 to travel, for example, on a snowy road or lane, while ensuring safety by keeping the vicinity of the middle of the road or lane. It is expected that the position and orientation of the vehicle 3 obtained by the third generation process makes it possible to, even on a snowy road or lane, keep the vicinity of the middle of the road or lane, as compared with the position and orientation obtained by the first generation process or the position and orientation obtained by the second generation process.

Figure 13:
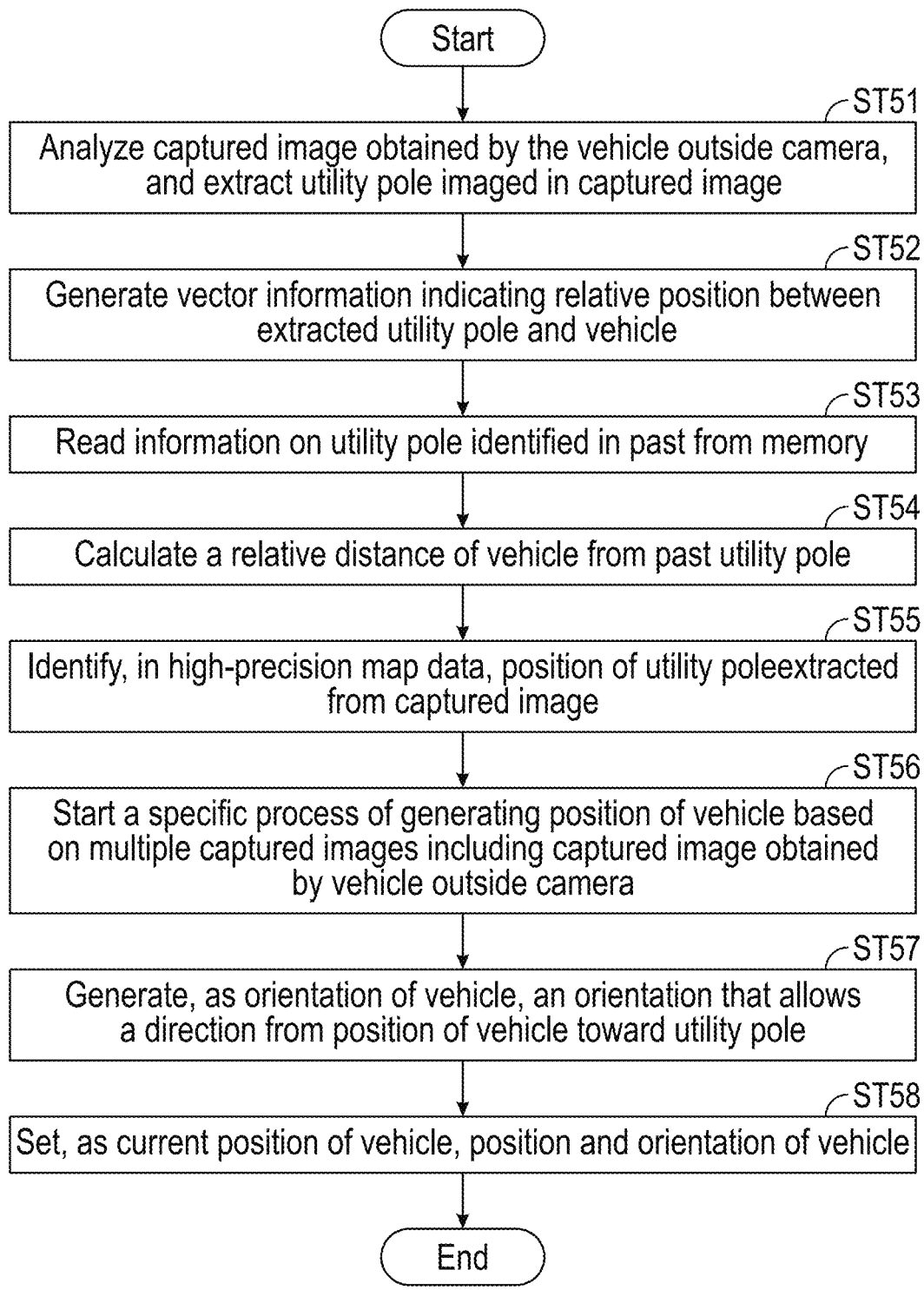
FIG. 13 is a flowchart illustrating a current position generation process based on multiple images in FIG. 7.

FIG. 13 is a flowchart illustrating a current position generation process based on multiple images in FIG. 7.

The ECU 44 of the traveling control apparatus 15 in FIG. 2 may execute, in step ST34 in FIG. 7, the multiple-image position generation process in FIG. 13.

In step ST51, the ECU 44 may analyze the captured image obtained by the vehicle outside camera 26, and extract the utility pole 68 imaged in the captured image. The extraction process here may be the same as that in step ST41.

In step ST52, the ECU 44 may generate vector information indicating the relative position between the extracted utility pole 68 and the vehicle 3. The generation process here may be the same as that in step ST42.

In step ST53, the ECU 44 may read the information on the utility pole 68 identified in the past from the memory 43. The memory 43 may hold the position, for example, of the utility pole 68, as the information on the utility pole 68 identified in the past, stored by the process of step ST35 in FIG. 7.

In step ST54, the ECU 44 may calculate a relative distance of the vehicle 3 from the past utility pole 68. The position based on the GNSS may be used as the position of the vehicle 3.

In step ST55, the ECU 44 may identify, in the high-precision map data 46, the position of the utility pole 68 extracted from the captured image, and the position of the utility pole 68 identified in the past. The identification process here may be the same as that in step ST43.

This enables the ECU 44 to identify, in the high-precision map data 46, the position of the utility pole 68 serving as the single standing structure included in the latest captured image obtained by the vehicle outside camera 26, and the position of the utility pole 68 based on the past captured image.

From step ST56, the ECU 44 may start a specific process of generating the position of the vehicle 3 based on multiple captured images including the captured image obtained by the vehicle outside camera 26. In the example embodiment, the ECU 44 may generate the current position of the vehicle 3 by the multiple-image position generation process, by two-step processes of a position generation process in step ST56 and an orientation generation process in step ST57.

In the position generation process in step ST56, the ECU 44 may generate the position of the vehicle 3, on the basis of the position of the utility pole 68 identified on the basis of the captured image this time, and the position of the utility pole 68 identified on the basis of the past captured image. The position of the vehicle 3 may be a position at which a distance from the utility pole 68 this time is the relative distance Ld and a distance from the utility pole 68 in the past is the relative distance calculated in step ST54. The ECU 44 may generate, on the basis of a triangle having the two utility poles 68 and the vehicle 3 as vertices in the high-precision map data 46, a position of the vertex corresponding to the vehicle 3.

In the orientation generation process in step ST57, the ECU 44 may generate, as the orientation of the vehicle 3, an orientation that allows a direction from the position of the vehicle 3 toward the utility pole 68 this time to have the relative angle θd generated on the basis of the captured image.

This enables the ECU 44 to generate the position and orientation of the vehicle 3.

In step ST58, the ECU 44 may set, as the current position of the vehicle 3, the position and orientation of the vehicle 3 generated in the processes up to step ST57.

In this manner, the ECU 44 is able to generate the current position of the vehicle 3, by the multiple-image position generation process based on the captured image obtained by the vehicle outside camera 26 and the past captured image.

Figure 14:
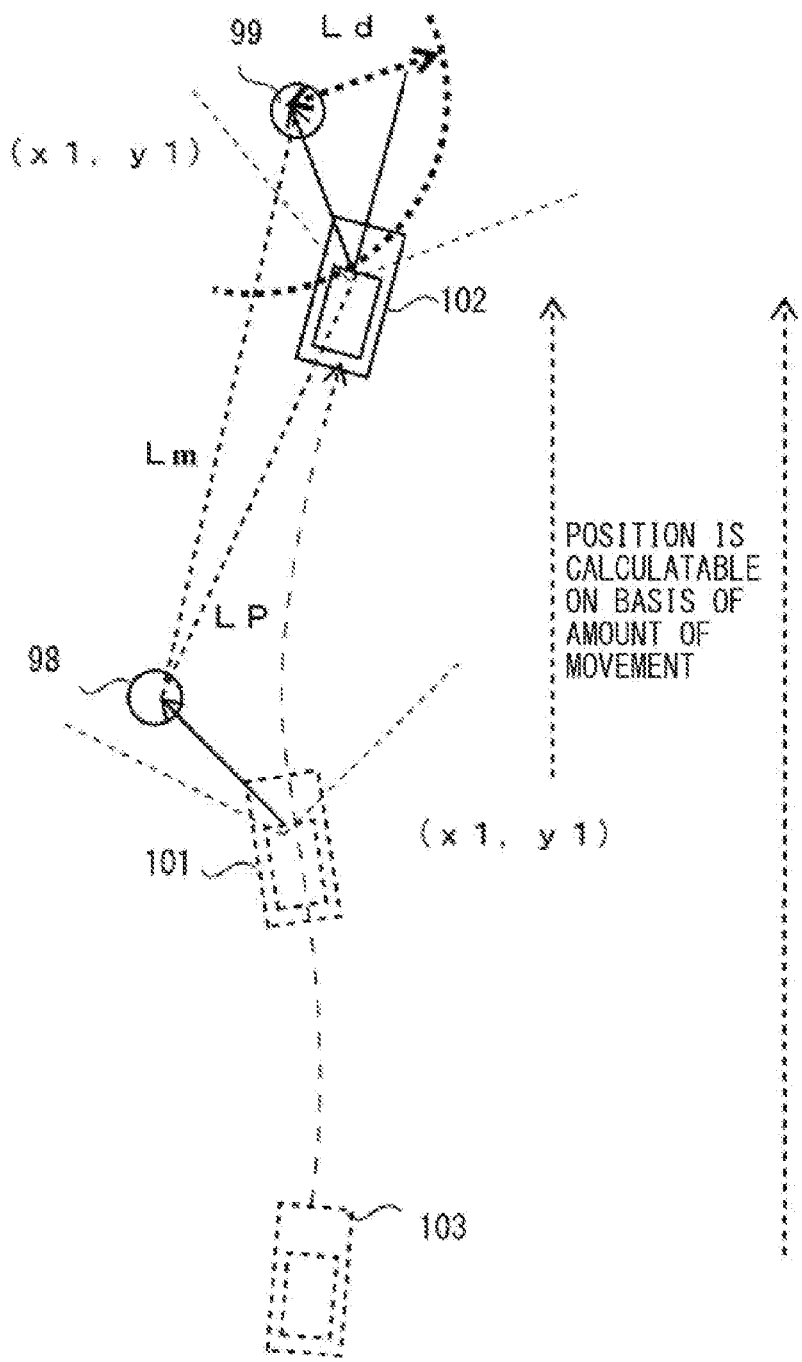
FIG. 14 is an explanatory diagram illustrating a method of generating a position of the vehicle by a multiple-image position generation process.

A detailed description is given next of the position generation process using the multiple-image position generation process, with reference to FIG. 14.

The road on which the vehicle 3 actually travels may be present in a three-dimensional space. However, to simplify the description here, an X-Y two-dimensional space is used for the description.

FIG. 14 is an explanatory diagram illustrating a method of generating the position of the vehicle 3 by the multiple-image position generation process.

FIG. 14 illustrates, together with the vehicle 3 traveling in a direction from the bottom to the top of the drawing, a first utility pole 99 identified on the basis of the captured image obtained by the vehicle outside camera 26, and a second utility pole 98 that has been identified on the basis of the previous captured image.

The first utility pole 99 may be a utility pole identified in the process this time by the ECU 44, as the utility pole 68 included in the latest captured image obtained by the vehicle outside camera 26.

The second utility pole 98 may be a utility pole identified in the past process by the ECU 44, as the utility pole 68 included in the previous captured image.

In FIG. 14, the vehicle 3 traveling is indicated by a solid line at the current position, and indicated by a dashed line at the past position.

In the position generation process using the multiple-image position generation process, the ECU 44 may calculate the amount of movement from vehicles 101 and 103 at the past positions, to obtain the provisional current position of the vehicle 3. Such a provisional current position may be basically generated on the basis of the position and orientation based on the GNSS. Note that, if the calculation is performed with respect to the vehicle 103 at the past position for which a highly accurate position and orientation have been obtained as the position and orientation based on the GNSS, an error in the amount of movement based on measurement by the detection member can be large. Therefore, instead of using the dashed-line position of the vehicle 103 illustrated in a lower part of the drawing as a reference, the dashed-line previous position of the vehicle 101 illustrated in the middle of the drawing may be used as a reference. Reducing the amount of movement makes it possible to reduce an error in the position calculated using the amount of movement, and improve the accuracy of the position.

In this case, the ECU 44 may estimate the distance of the vehicle 3, at a time when the vehicle outside camera 26 has captured the latest image, from the second utility pole 98 identified in the past held by the memory 43.

Thereafter, the ECU 44 may calculate a relative distance LP from the second utility pole 98 to a vehicle 102 in the high-precision map data 46. The ECU 44 may calculate, in the high-precision map data 46, the relative distance LP from the vehicle 102 present at the provisional current position to the second utility pole 98.

The ECU 44 may also calculate, on the basis of the high-precision map data 46, a distance Lm between the utility poles from the position of the first utility pole 99 to the position of the second utility pole 98.

In addition, the ECU 44 may generate, on the basis of the captured image obtained by the vehicle 3, the relative distance Ld from the position of the vehicle 102 at the provisional current position to the first utility pole 99.

Further, the ECU 44 may generate the position of the vehicle 3 by applying a theorem of trigonometric functions to a triangle having these distances as three sides.

Thereafter, by the orientation generation process similar to that described with reference to the lower part of FIG. 11, the ECU 44 may generate, as the orientation of the vehicle 3, an orientation that allows a direction from the vehicle 3 at the generated position toward the identified first utility pole 99 to have a relative angle generated on the basis of the captured image. The ECU 44 may generate the orientation of the vehicle 3 in the high-precision map data 46, by using the angle-of-view position θd of the first utility pole 99 in the latest captured image obtained by the vehicle outside camera 26.

This enables the ECU 44 to generate the position and orientation of the vehicle 3 on the basis of multiple captured images.

The position generated in this manner is likely to have improved reliability as compared with the above-described position based on one utility pole or pole. The utility pole or pole may basically have a cylindrical shape. Therefore, even if an image of one utility pole or pole is captured, a relative direction of the own vehicle from the utility pole or pole can be unable to achieve high accuracy. It can be unclear in which direction, on a circumference around the utility pole or pole with the cylindrical shape, the position of the own vehicle is located. Determining the position of the own vehicle on the basis of multiple utility poles or poles as in this process makes it possible to improve the reliability of the position.

Note that the ECU 44 may calculate a relative direction instead of the relative distance LP between the vehicle 102 at the provisional current position and the past second utility pole 98. In this case, the ECU 44 may generate the position of the vehicle 3, on the basis of the relative direction from the second utility pole 98 and the relative angle from the first utility pole 99. The ECU 44 is able to generate the current position of the vehicle 3 in the high-precision map data 46, on the basis of the distance or direction from each of the multiple utility poles 98 and 99 whose positions have been identified.

In the example embodiment, in the multiple-image position generation process, the ECU 44 may thus estimate the relative distance LP of the vehicle 3, at a time when the vehicle outside camera 26 has captured the latest image, from the standing structure in the past held by the memory 43. In addition, the ECU 44 may identify, in the high-precision map data 46, the position of each of the latest one or more standing structures included in the latest captured image obtained by the vehicle outside camera 26, and the position of each of the one or more standing structures in the past. The ECU 44 is able to generate the current position of the vehicle 3 in the high-precision map data 46 in a reliable manner, on the basis of the respective distances from the standing structures whose positions have been identified.

In this case, the ECU 44 is able to further generate the orientation of the vehicle 3 in the high-precision map data 46 in a reliable manner, by using the angle-of-view position θd of the standing structure in the latest captured image obtained by the vehicle outside camera 26.

The position and orientation of the vehicle 3 obtained by such a multiple-image position generation process are able to be a reliable position and orientation suitable for traveling control of the vehicle 3, even if the dead reckoning state in which highly accurate position information is not obtained from the GNSS receiver 25 continues for a long time. For example, even while traveling on a straight and long road or lane that is snowy or frozen in the dead reckoning state, the vehicle 3 is able to have its current position keep being updated with a reliable current position. This enables the vehicle 3 to keep traveling while keeping the vicinity of the middle of the straight and long road or lane.

As described above, in the example embodiment, the high-precision map data 46 held by the memory 43 includes information on at least the position of the standing structure, such as the utility pole 68, provided to stand along the road on which the vehicle 3 travels. The information on the position of the standing structure may be at least information on the positions of poles including the utility poles 68 arranged to stand along the road on which the vehicle 3 travels. The ECU 44 acquires information from the memory 43 and the vehicle outside camera 26, and processes the acquired information. The ECU 44 generates information on the one or more standing structures included in the captured image obtained by the vehicle outside camera 26, and identifies, in the high-precision map data 46, the positions of the one or more standing structures on which the information has been generated. Thereafter, the ECU 44 generates the current position of the vehicle 3 on the road on which the vehicle 3 is traveling in the high-precision map data 46, on the basis of the positions of the one or more standing structures identified in the high-precision map data 46, and the captured image.

For example, in the example embodiment, as the standing structure to be identified to generate the position, the poles including the utility poles 68 arranged to stand along the road on which the vehicle 3 travels may at least be used. Such standing structures are used widely and universally along the road on which the vehicle 3 travels, unlike a structure such as the signboard 66. The standing structure is not likely to be entirely covered by snow or dirt, for example, unlike the zebra zone 62, the stop line 63, and the traffic marking 64 drawn on the road surface. At least a part of the standing structure near the road surface is able to be imaged even in morning or evening time when the sun is low. As a result, when the vehicle 3 is traveling, the ECU 44 is able to keep obtaining the image of the standing structure in the captured image obtained by the vehicle outside camera 26. In addition, the ECU 44 is able to generate, from the captured image, information on the standing structure included in the captured image with high probability. Moreover, the standing structure may have a characteristic of being arranged to stand along the road on which the vehicle 3 travels. Therefore, the ECU 44 may correct the position, each time an image of the standing structure is captured. This makes it possible to keep generating a position maintaining reliability as the current position of the vehicle 3.

In the example embodiment, it is thus possible to improve the reliability of the generated vehicle position.

In the example embodiment, the ECU 44 can be able to generate only information on one utility pole 68 from the captured image obtained by the vehicle outside camera 26.

In this case, the ECU 44 may be able to identify only one utility pole 68 in the map data, and able to generate only the position of the vehicle 3 based on the one utility pole 68. In contrast, if multiple utility poles 68 are extractable from the captured image obtained by the vehicle outside camera 26, for example, the ECU 44 is able to increase the accuracy of the position of the vehicle 3 on the basis of the utility poles 68.

To compensate for such shortage of information, in the example embodiment, information on the utility pole 68 generated on the basis of the captured image in the past may be stored in the memory 43. Even if the ECU 44 is able to generate only information on one utility pole 68 in the captured image obtained by the vehicle outside camera 26, the ECU 44 may use the information on the utility pole 68 in the past held by the memory 43, together with the information on the one utility pole 68. This makes it possible to generate a reliable current position based on the positions of the multiple utility poles 68. The ECU 44 is able to execute not only the single-image position generation process based on only the captured image obtained by the vehicle outside camera 26, but also the multiple-image position generation process using the position of the past utility pole 68.

The ECU 44 may select, as a final current position of the vehicle 3, one of the position obtained by the single-image position generation process and the position obtained by the multiple-image position generation process, depending on information such as the traveling situation of the vehicle 3 or the information on the past utility pole 68 held by the memory 43.

For example, when the information on the past utility pole 68 held by the memory 43 is not as old as the threshold or more, or when the position of the past utility pole 68 held by the memory 43 is not as far as the threshold or more, the ECU 44 may select the position obtained by the multiple-image position generation process as the final current position of the vehicle 3. In contrast, when the information on the past utility pole 68 held by the memory 43 is as old as the threshold or more, or when the position of the past utility pole 68 held by the memory 43 is far, i.e., away from the position of the latest utility pole 68 by the threshold or more, the ECU 44 may select the position obtained by the single-image position generation process as the final current position of the vehicle 3.

Second Example Embodiment

Described next is a second example embodiment of the disclosure. The following description includes description of differences from the foregoing example embodiment. Features similar to those in the foregoing example embodiment are denoted with the same reference signs as those in the foregoing example embodiment, and descriptions thereof are omitted.

In the example embodiment, the server 31 may control the traveling of the vehicle 3.

As illustrated in FIG. 2, the control system 10 of the vehicle 3 configured to execute automatic driving may include the external communication apparatus 17 communicable with the external server 31 via the base station 30. In this case, the server 31 may collect and acquire, from multiple vehicles 3 traveling on a road including a merging section, information regarding the traveling of each vehicle 3, and generate a traveling control value to be used for traveling control of each vehicle 3 on the basis of the acquired information. In addition, the control system 10 of the vehicle 3 is able to receive and acquire a traveling control value from the server 31, and use the traveling control value for the traveling control of the vehicle 3. In this case, the server 31 may control the traveling of the vehicles 3 traveling in the merging section by remote control or traffic control. In this manner, the server 31 may acquire information regarding the traveling of the vehicles 3 from the vehicles 3 traveling in the merging section. The server 31 may generate, on the basis of the acquired information, a traveling control value to control the traveling of the vehicle 3 traveling on a merging destination lane L, to cause the control target vehicle 3 to merge immediately in front of the vehicle 3 traveling on the merging destination lane L.

Figure 15:
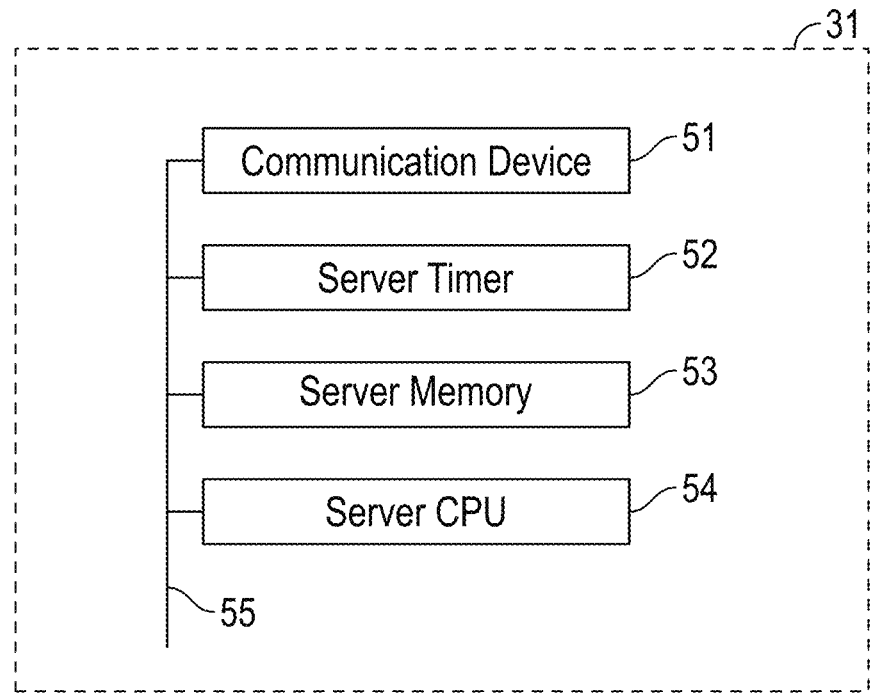
FIG. 15 is an explanatory diagram illustrating a server that controls traveling of the vehicle, according to one example embodiment of the disclosure.

FIG. 15 is an explanatory diagram illustrating the server 31 that controls the traveling of the vehicle 3, according to the second example embodiment of the disclosure.

The server 31 in FIG. 15 may include a communication device 51, a server timer 52, a server memory 53, a server CPU 54, and a server bus 55. The communication device 51, the server timer 52, the server memory 53, and the server CPU 54 may be coupled to the server bus 55.

The communication device 51 may be coupled to a communication network such as the Internet. The communication device 51 may transmit and receive information to and from, for example, the vehicle 3 traveling on a road, via the base station 30 coupled to the communication network, for example. The communication device 51 may be a communicator communicable with the vehicle 3 to control or assist the traveling of the vehicle 3.

The server timer 52 may measure a time and a time period. The time of the server timer 52 may be calibrated by a time based on radio waves from the unillustrated GNSS satellites. The time of the server timer 52 in this case may synchronize with the time of the vehicle 3.

The server memory 53 may hold a program to be executed by the server CPU 54, and data. The server memory 53 may include, for example, a nonvolatile semiconductor memory, a hard disk drive (HDD), or a random access memory (RAM).

The server CPU 54 may read the program held by the server memory 53 and execute the program. This enables a server processor to be implemented. The server CPU 54 as the server processor may manage operation of the server 31. The server processor may serve as a vehicle traveling control apparatus that remotely controls the traveling of the vehicle 3.

In one embodiment, in the server 31, the server CPU 54 may thus serve as a "traveling control processor" that generates traveling control information, e.g., a traveling control value, to be used to control the traveling of the vehicle 3.

The communication device 51 transmits the traveling control information generated by the traveling control processor to the vehicle 3. In one embodiment, the communication device 51 may serve as a "transmission device".

Figure 16:
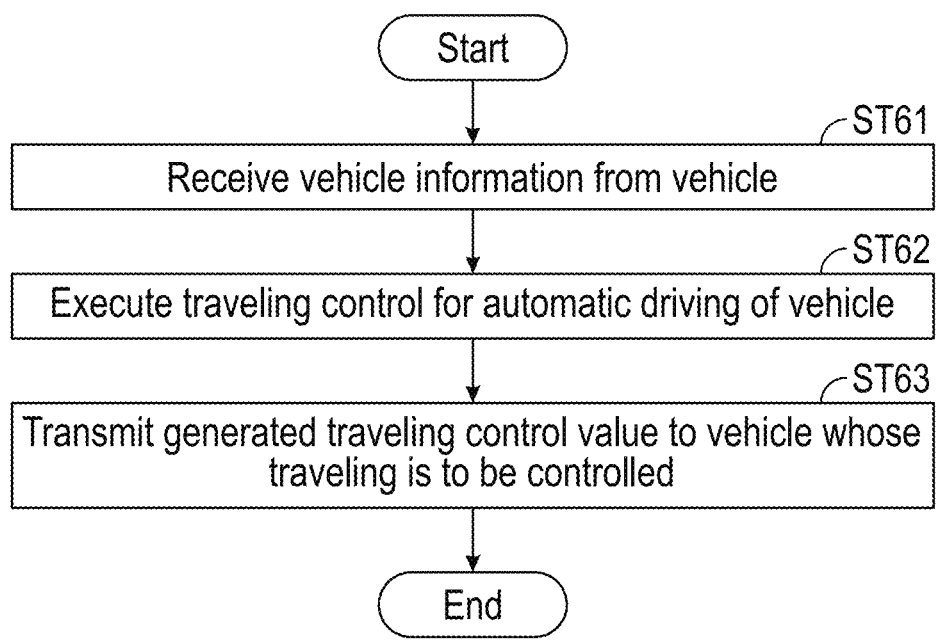
FIG. 16 is a flowchart illustrating server traveling control to be performed by the server in FIG. 15.

FIG. 16 is a flowchart illustrating server traveling control to be performed by the server 31 in FIG. 15.

The server CPU 54, serving as the traveling control processor of the server 31, may repeatedly execute the server traveling control in FIG. 16.

In step ST61, the server CPU 54 may receive vehicle information from the vehicle 3. The vehicle 3 may transmit, as an example of the vehicle information, the detection information obtained by the detection member, such as the captured image obtained by the vehicle outside camera 26, from the external communication apparatus 17 to the server 31 via the base station 30. The communication device 51 of the server 31 may receive the vehicle information transmitted by the vehicle 3. The communication device 51 may receive the vehicle information on multiple vehicles 3.

In step ST62, the server CPU 54 may execute traveling control for automatic driving of the vehicle 3.

The server CPU 54 may acquire or generate the current position of the vehicle 3, and generate a course from the current position. For example, the server CPU 54 may map the vehicles 3 traveling on the road on the high-precision map data 46 held by the server memory 53, and generate a course that avoids interference with another vehicle as the course of each vehicle 3. The server CPU 54 may generate, for each vehicle 3, a traveling control value that allows for safe and smooth traveling in the corresponding course.

When acquiring or generating the current position of the vehicle 3, the server CPU 54 may make a determination regarding the position acquired from each vehicle 3 by a process similar to the traveling control based on automatic driving in FIG. 5, and acquire or generate the current position for the traveling control.

In step ST63, the server CPU 54 may transmit the generated traveling control value to the vehicle 3 whose traveling is to be controlled. The traveling control value may be transmitted from the communication device 51 of the server 31 to the external communication apparatus 17 of the vehicle 3 via the base station 30. The ECU 44 of the traveling control apparatus 15, for example, of the vehicle 3 may output the traveling control value received from the server 31, in place of a control value generated by the own vehicle, to the driving control apparatus 11, the steering control apparatus 12, and the braking control apparatus 13.

As described above, in step ST62 in FIG. 16, the server CPU 54 of the server 31 may execute a process similar to that to be performed by the ECU 44 of the traveling control apparatus 15 of the control system 10 of the vehicle 3 in the foregoing example embodiment.

In this case, the server CPU 54, serving as the traveling control processor of the server 31, may generate a traveling control value for the vehicle 3, assuming that the vehicle 3 is located at, for example, the current position generated on the basis of the captured image.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the foregoing example embodiment, the ECU 44 may use the position and orientation of the vehicle 3 obtained by the third generation process for the traveling control of the vehicle 3, in the single-image position generation process.

In another example, in the single-image position generation process, the ECU 44 may use the position and orientation of the vehicle 3 obtained by the first generation process for the traveling control of the vehicle 3. In another example, in the single-image position generation process, the ECU 44 may use the position and orientation of the vehicle 3 obtained by the second generation process for the traveling control of the vehicle 3. In another example, the ECU 44 may switch between the positions and orientations of the vehicle 3 obtained by these multiple generation processes, depending on the traveling situation of the vehicle 3, for example, and use the selected position and orientation for the traveling control of the vehicle 3.

In the foregoing example embodiment, the ECU 44 may switch between the single-image position generation process based on only the captured image obtained by the vehicle outside camera 26, and the multiple-image position generation process that uses the information on the past utility pole 68 in the memory 43 in combination, depending on the traveling situation of the vehicle 3, and use the selected position generation process for the traveling control of the vehicle 3.

In another example, the ECU 44 may use, for the traveling control of the vehicle 3, only the single-image position generation process based on only the captured image obtained by the vehicle outside camera 26. In another example, the ECU 44 may use only the multiple-image position generation process for the traveling control of the vehicle 3.

In the foregoing example embodiment, the ECU 44 may generate, from the captured image, information on only, for example, poles including the utility poles 68 arranged to stand along the road on which the vehicle 3 travels, as the information on the standing structure to be used as a reference for the traveling control.

In another example, the ECU 44 may also generate, from the captured image, information on a standing structure other than the utility pole 68 provided to stand along the road, for example, the signboard 66 installed near the road, as the information on the standing structure to be used as a reference for the traveling control.

In another example, the ECU 44 may also generate, from the captured image, information on a midair structure such as the road sign 65 or the traffic light 61 provided in the air above the road, as the information on the structure to be used as a reference for the traveling control.

In another example, the ECU 44 may also generate, from the captured image, a road surface drawn object such as the zebra zone 62, the stop line 63, or the traffic marking 64 drawn on the road surface of the road, as the information on the structure to be used as a reference for the traveling control.

The ECU 44 may thus also generate, from the captured image, information on a structure other than the multiple standing structures arranged to stand along the road, as the information on the structure to be used as a reference for the traveling control. Note that, in a case of addressing various traveling situations of the vehicle 3, including snowfall and freezing of the road surface, the ECU 44 may generate, from the captured image, at least information on standing structures including the utility poles 68, the border poles 67, and other poles arranged to stand along the road on which the vehicle 3 travels, as the information on the structure to be used as a reference for the traveling control.

Figure 17:
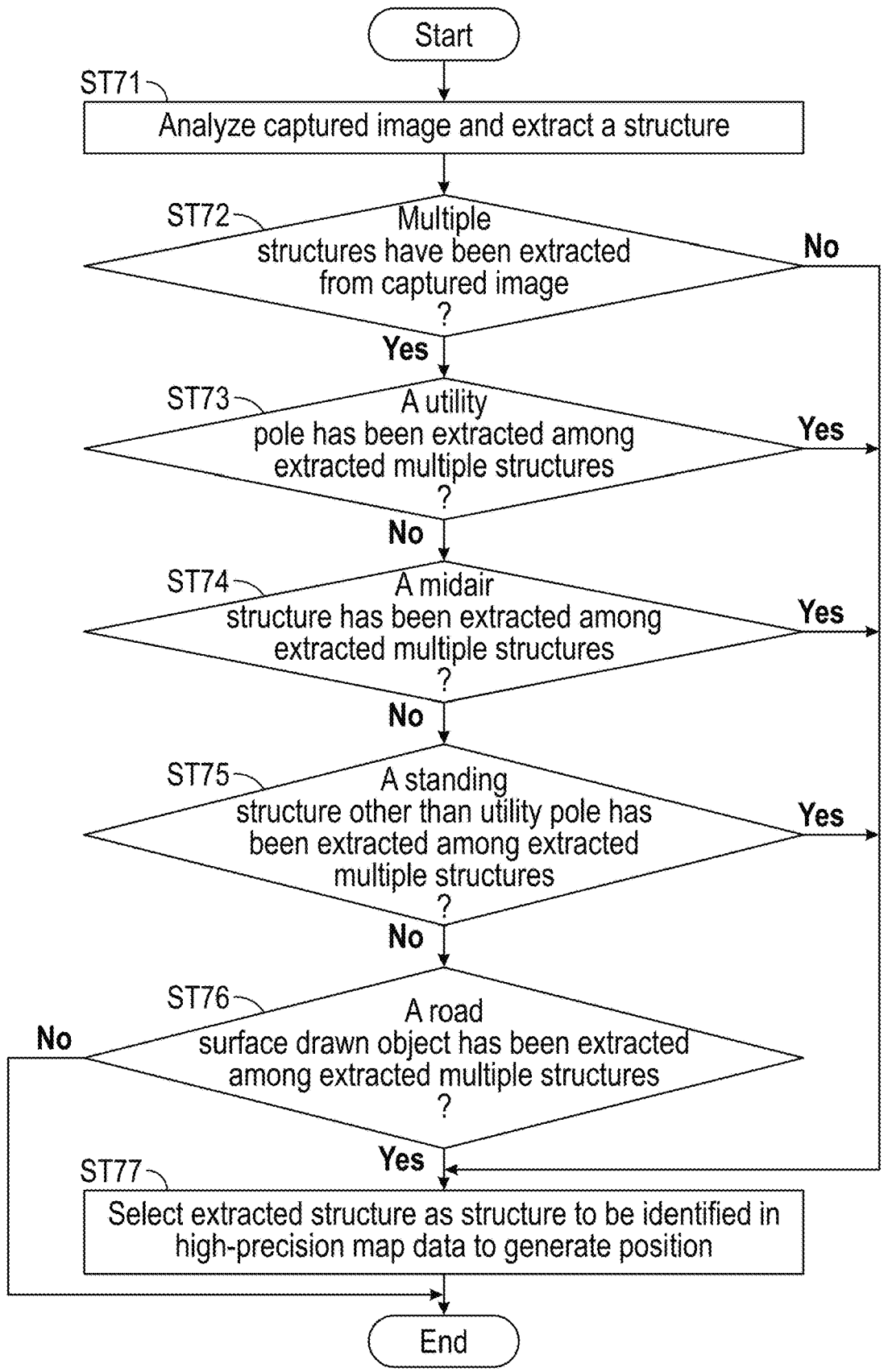
FIG. 17 is a flowchart illustrating selection control for a structure to be used for control when multiple structures are extracted from a captured image.

FIG. 17 is a flowchart illustrating selection control for a structure to be used for the control when multiple structures are extracted from the captured image.

The ECU 44 of the traveling control apparatus 15 in FIG. 2 may execute the structure selection control in FIG. 17, for example, in step ST41 in FIG. 8 or step ST51 in FIG. 13, and consequently select a utility pole extracted from the captured image.

Note that the server CPU 54 of the server 31 may also execute the structure selection control in FIG. 17 in step ST62 in FIG. 16, and consequently select a utility pole extracted from the captured image.

In step ST71, the ECU 44 may analyze the captured image obtained by the vehicle outside camera 26, and extract a structure such as a utility pole included in the captured image. Various structures may be extracted from the captured image obtained by the vehicle outside camera 26, depending on the position and orientation in which the vehicle 3 travels.

In step ST72, the ECU 44 may determine whether multiple structures have been extracted from the captured image. If multiple structures have been extracted (ST72: Y), the ECU 44 may cause the flow to proceed to step ST73. If one structure has been extracted (ST72: N), the ECU 44 may cause the flow to proceed to step ST77.

In step ST73, the ECU 44 may determine whether a utility pole has been extracted among the extracted multiple structures. If a utility pole has been extracted (ST73: Y), the ECU 44 may cause the flow to proceed to step ST77. Otherwise, i.e., if no utility pole has been extracted (ST73: N), the ECU 44 may cause the flow to proceed to step ST74.

In step ST74, the ECU 44 may determine whether a standing structure other than the utility pole has been extracted among the extracted multiple structures. Examples of the standing structure other than the utility pole may include the border pole 67, and the poles supporting the traffic light 61 and the road sign 65. If a standing structure other than the utility pole has been extracted (ST74: Y), the ECU 44 may cause the flow to proceed to step ST77. Otherwise (ST74: N), the ECU 44 may cause the flow to proceed to step ST75.

In step ST75, the ECU 44 may determine whether a midair structure has been extracted among the extracted multiple structures. Examples of the midair structure may include the traffic light 61 and the road sign 65. If a midair structure has been extracted (ST75: Y), the ECU 44 may cause the flow to proceed to step ST77. Otherwise (ST75: N), the ECU 44 may cause the flow to proceed to step ST76.

In step ST76, the ECU 44 may determine whether a road surface drawn object has been extracted among the extracted multiple structures. Examples of the road surface drawn object may include the zebra zone 62, the stop line 63, and the traffic marking 64. If a road surface drawn object has been extracted (ST76: Y), the ECU 44 may cause the flow to proceed to step ST77. Otherwise (ST76: N), the ECU 44 may end this control, without selecting the extracted structure for generation of the current position. In this case, the ECU 44 may set, for example, the position of the vehicle 3 based on the GNSS as the current position of the vehicle 3, without generating the position of the vehicle 3 based on the captured image, and execute the traveling control of the vehicle 3.

In step ST77, the ECU 44 may select the extracted structure as the structure to be identified in the high-precision map data 46 to generate the position based on the captured image. Thereafter, the ECU 44 may end this control. In this case, the ECU 44 may identify the position of the selected structure in the high-precision map data 46, and generate the position of the vehicle 3 on the basis of the position of the selected structure.

In this manner, when multiple kinds of structures are extractable from the captured image, the ECU 44 may preferentially select a standing structure such as a utility pole, out of the multiple kinds of structures, and use the standing structure for generation of the position based on the captured image. By preferentially selecting the standing structure such as the utility pole unsusceptible to snowfall or freezing of the road surface, the ECU 44 is able to generate the position of the traveling vehicle 3 regardless of the traveling environment. Moreover, the ECU 44 may preferentially select the utility pole whose image is likely to be captured by the vehicle outside camera 26 of the traveling vehicle 3. This makes it possible to shorten processing time before completion of the selection, as compared with a case of selecting the utility pole later. As a result, it is possible to effectively suppress lengthening of processing time of traveling control that is to be repeatedly executed in short time while the vehicle 3 is traveling. This enables the vehicle 3 to repeat the traveling control in a short cycle while traveling.

Each of the ECU 44 illustrated in FIG. 3 and the server CPU 54 illustrated in FIG. 15 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the ECU 44 and the server CPU 54. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the ECU 44 illustrated in FIG. 3 and the server CPU 54 illustrated in FIG. 15.

The invention claimed is:

1. A vehicle position generation apparatus to be applied to a vehicle, the vehicle position generation apparatus comprising:
an imaging device configured to capture first and second images of a forward environment in a traveling direction of the vehicle, the first image being captured at a first time, the second image being captured at a second time later than the first time;
a memory configured to store map data comprising positions of standing structures arranged along a road on which the vehicle travels; and
a processor configured to:
generate first information on a first set of one or more standing structures included in the first image;
cause the memory to store the generated first information on the first set of one or more standing structures included in the first image;
generate second information on a second set of one or more standing structures included in the second image;
determine whether to perform a multiple-image position generation process or a single-image position generation process based on i) a time period between the first time at which the first image was captured and the second time at which the second image was captured and ii) a separation distance between a first position of the vehicle at the first time and a second position of the vehicle at the second time;
execute, based on determining that i) the time period is equal to or more than a threshold time period and ii) the separation distance is equal to or more than a threshold separation distance, the single-image position generation process to generate a position of the vehicle based on the second information and the map data; and
execute, based on determining that i) the time period is less than the threshold time period and ii) the separation distance is less than the threshold separation distance, the multiple-image position generation process to generate the position of the vehicle based on the first information, the second information, and the map data,
wherein the vehicle comprises a traveling control apparatus configured to control traveling of the vehicle using the generated position of the vehicle.

2. The vehicle position generation apparatus according to claim 1, wherein:
the map data comprises, as the positions of the standing structures, positions of multiple utility poles arranged to along the road on which the vehicle travels; and
the processor is configured to:
generate, based on the captured second image obtained by the imaging device, information on an angle-of-view position as imaged from the vehicle, information on a relative distance from the vehicle, and information on positions of one or more utility poles comprised in the captured second image; and
identify a relevant one of the one or more utility poles in the map data, based on a relative position relationship between the one or more utility poles on which the information has been generated.

3. The vehicle position generation apparatus according to claim 2, wherein the processor is configured to, in the single-image position generation process,
identify, in the map data, the position of each of the one or more standing structures comprised in the captured second image obtained by the imaging device, and
generate the position of the vehicle in the map data, based on an angle-of-view position of each of the one or more standing structures in the captured second image obtained by the imaging device.

4. The vehicle position generation apparatus according to claim 2, wherein the processor is configured to, in the single-image position generation process, generate the position of the vehicle in the map data by one generation process out of:
a first generation process of generating, as a position of the vehicle, a position that allows the vehicle to keep an orientation based on an angle-of-view position of each of the identified one or more standing structures in the captured image obtained by the imaging device, and have a distance from each of the identified one or more standing structures estimated from the captured image;
a second generation process of generating, as a position of the vehicle, a position that is between the position of each of the one or more standing structures identified in the map data and a provisional position of the vehicle before correction, and has the distance estimated from the captured image, and generating an orientation of the vehicle that allows the angle-of-view position of each of the identified one or more standing structures in the captured image obtained by the imaging device to be obtained at the generated position; and
a third generation process of generating, as a final position of the vehicle, a position between the position obtained by the first generation process and the position obtained by the second generation process.

5. The vehicle position generation apparatus according to claim 2, wherein the processor is configured to, in the multiple-image position generation process,
estimate a distance of the vehicle, at a time when the imaging device has captured the image, from each of the one or more standing structures in the past held by the memory,
identify, in the map data, the position of each of the one or more standing structures comprised in the captured image obtained by the imaging device, and a position of each of the one or more standing structures in the past for which the distance has been estimated, generate the position of the vehicle in the map data, based on respective distances from the standing structures whose positions have been identified, and generate an orientation of the vehicle in the map data, by using an angle-of-view position of each of the one or more standing structures in the captured image obtained by the imaging device.

6. The vehicle position generation apparatus according to claim 2, further comprising a position information generation device configured to provide position information regarding a position of the vehicle to the processor, wherein the processor is configured to generate the position of the vehicle based on the captured second image obtained by the imaging device, at least until the position of the vehicle provided from the position information generation device or a position based on the provided position comes to have, with each of the identified one or more standing structures in the map data, a relative position relationship matching an angle-of-view position of each of the identified one or more standing structures in the captured second image obtained by the imaging device.

7. A server comprising:

a traveling control processor configured to generate traveling control information to be used to control traveling of a vehicle; and a transmission device configured to transmit the traveling control information generated by the traveling control processor to the vehicle, wherein the traveling control processor is configured to generate the traveling control information, assuming that the vehicle is located at the position generated by the vehicle position generation apparatus according to claim 2.

8. The vehicle position generation apparatus according to claim 1, wherein the processor is configured to, in the single-image position generation process, identify, in the map data, the position of each of the one or more standing structures comprised in the captured second image obtained by the imaging device, and generate the position of the vehicle in the map data, based on an angle-of-view position of each of the one or more standing structures in the captured second image obtained by the imaging device.

9. The vehicle position generation apparatus according to claim 1, wherein the processor is configured to, in the single-image position generation process, generate the position of the vehicle in the map data by one generation process out of:

a first generation process of generating, as a position of the vehicle, a position that allows the vehicle to keep an orientation based on an angle-of-view position of each of the identified one or more standing structures in the captured image obtained by the imaging device, and have a distance from each of the identified one or more standing structures estimated from the captured image;

a second generation process of generating, as a position of the vehicle, a position that is between the position of each of the one or more standing structures identified in the map data and a provisional position of the vehicle before correction, and has the distance estimated from the captured image, and generating an orientation of the vehicle that allows the angle-of-view position of each of the identified one or more standing structures in the captured image obtained by the imaging device to be obtained at the generated position; and a third generation process of generating, as a final position of the vehicle, a position between the position obtained by the first generation process and the position obtained by the second generation process.

10. The vehicle position generation apparatus according to claim 1, wherein the processor is configured to, in the multiple-image position generation process, estimate a distance of the vehicle, at a time when the imaging device has captured the image, from each of the one or more standing structures in the past held by the memory, identify, in the map data, the position of each of the one or more standing structures comprised in the captured image obtained by the imaging device, and a position of each of the one or more standing structures in the past for which the distance has been estimated, generate the position of the vehicle in the map data, based on respective distances from the standing structures whose positions have been identified, and generate an orientation of the vehicle in the map data, by using an angle-of-view position of each of the one or more standing structures in the captured image obtained by the imaging device.

11. The vehicle position generation apparatus according to claim 1, further comprising a position information generation device configured to provide position information regarding a position of the vehicle to the processor, wherein the processor is configured to generate the position of the vehicle based on the captured second image obtained by the imaging device, at least until the position of the vehicle provided from the position information generation device or a position based on the provided position comes to have, with each of the identified one or more standing structures in the map data, a relative position relationship matching an angle-of-view position of each of the identified one or more standing structures in the captured second image obtained by the imaging device.

12. A server comprising:

a traveling control processor configured to generate traveling control information to be used to control traveling of a vehicle; and a transmission device configured to transmit the traveling control information generated by the traveling control processor to the vehicle, wherein the traveling control processor is configured to generate the traveling control information, assuming that the vehicle is located at the position generated by the vehicle position generation apparatus according to claim 1.

13. The vehicle position generation apparatus according to claim 1, wherein when determining that the first image is old at the second time, the first image being captured at the first time which passed by predetermined time, the processor is configured to:

calculate first position, in the map data, of a first standing structure on which the information has been generated from the first image stored in the memory, calculate second position, in the map data, of a second standing structure other than the second standing structure, on which the information has been generated from the second image captured at the second time, and calculate a position of the vehicle using a first distance from the first standing structure to the vehicle using the map data, a second distance from the second standing structure to the vehicle using the second image, and
a third distance from the second standing structure to the first standing structure.

\* \* \* \* \*